April 23, 1940.  W. FERRIS  2,198,035
SPEED CONTROLLER
Filed Oct. 28, 1935  20 Sheets-Sheet 1

INVENTOR
WALTER FERRIS
BY
ATTORNEY.

April 23, 1940.  W. FERRIS  2,198,035
SPEED CONTROLLER
Filed Oct. 28, 1935   20 Sheets-Sheet 3

INVENTOR
WALTER FERRIS
BY
ATTORNEY.

April 23, 1940.　　　W. FERRIS　　　2,198,035
SPEED CONTROLLER
Filed Oct. 28, 1935　　　20 Sheets-Sheet 4

INVENTOR
WALTER FERRIS
BY
ATTORNEY.

April 23, 1940.  W. FERRIS  2,198,035
SPEED CONTROLLER
Filed Oct. 28, 1935   20 Sheets-Sheet 6

INVENTOR
WALTER FERRIS
BY
/ATTORNEY.

April 23, 1940.     W. FERRIS     2,198,035
SPEED CONTROLLER
Filed Oct. 28, 1935     20 Sheets-Sheet 10
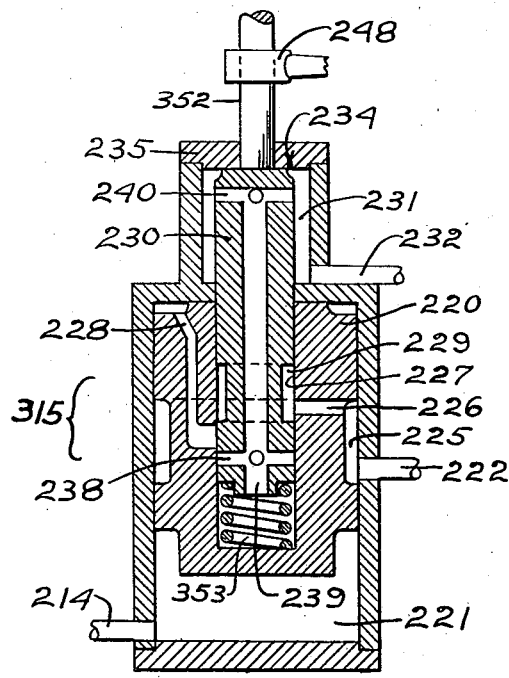
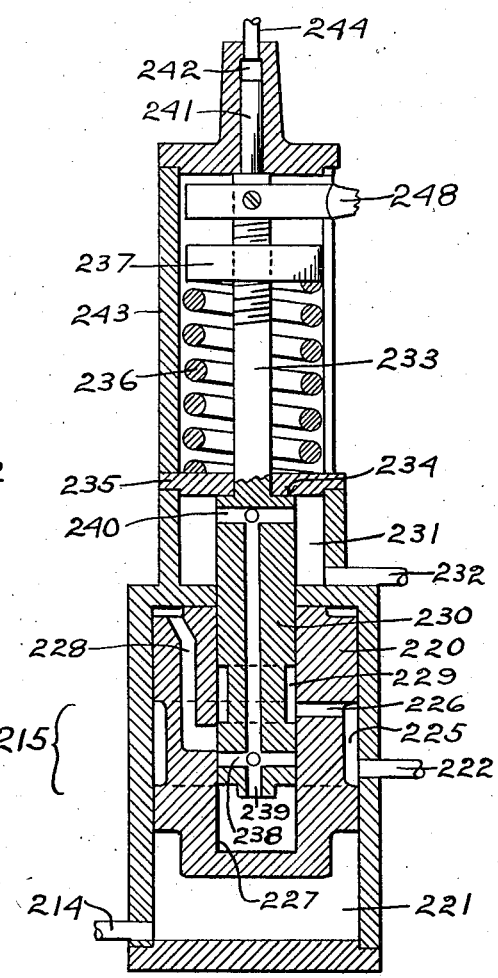
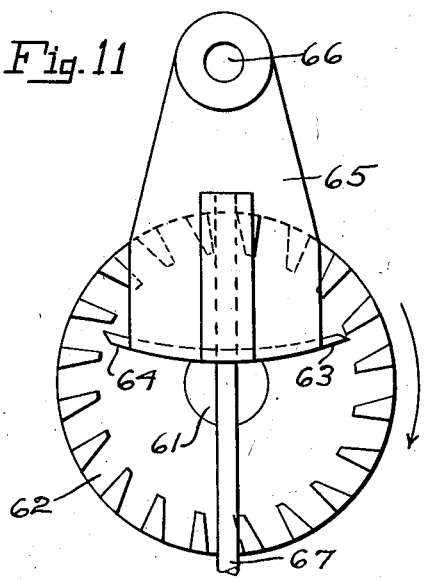
INVENTOR
WALTER FERRIS
BY
Wesley P Meuriel
ATTORNEY.

April 23, 1940.   W. FERRIS   2,198,035
SPEED CONTROLLER
Filed Oct. 28, 1935    20 Sheets-Sheet 11

INVENTOR
WALTER FERRIS
BY
ATTORNEY.

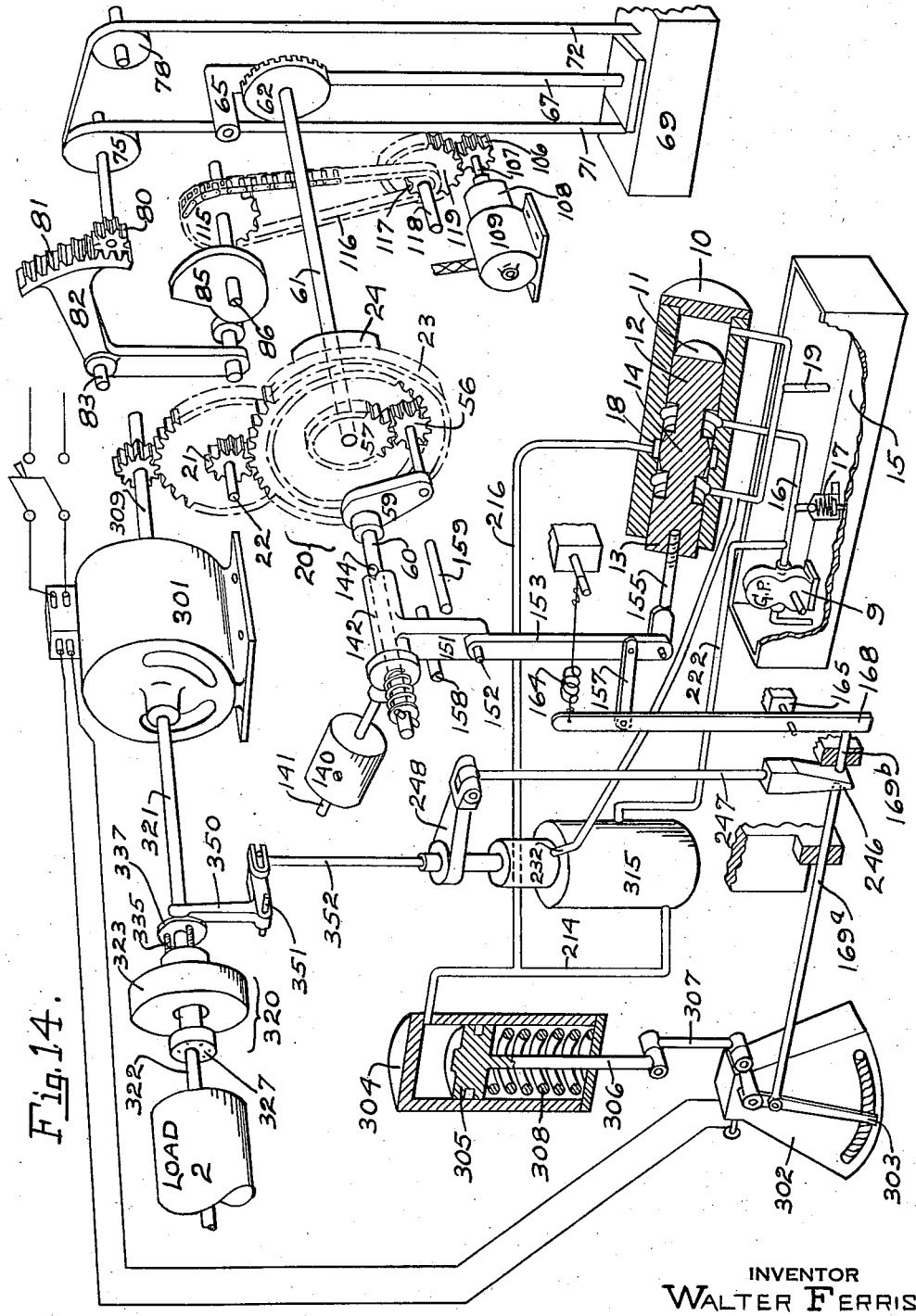

April 23, 1940. W. FERRIS 2,198,035
SPEED CONTROLLER
Filed Oct. 28, 1935 20 Sheets-Sheet 13
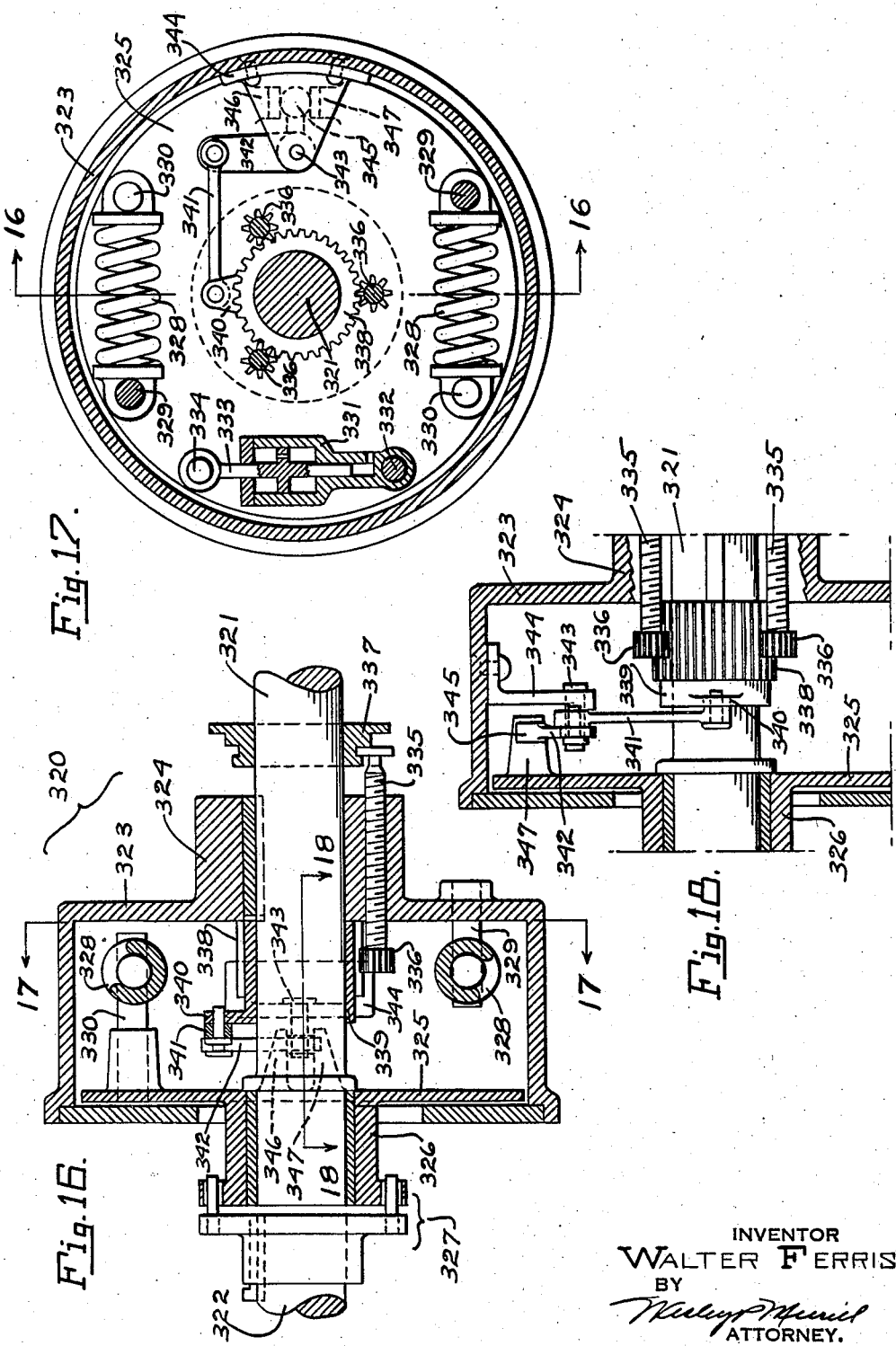
INVENTOR
WALTER FERRIS
BY
ATTORNEY.

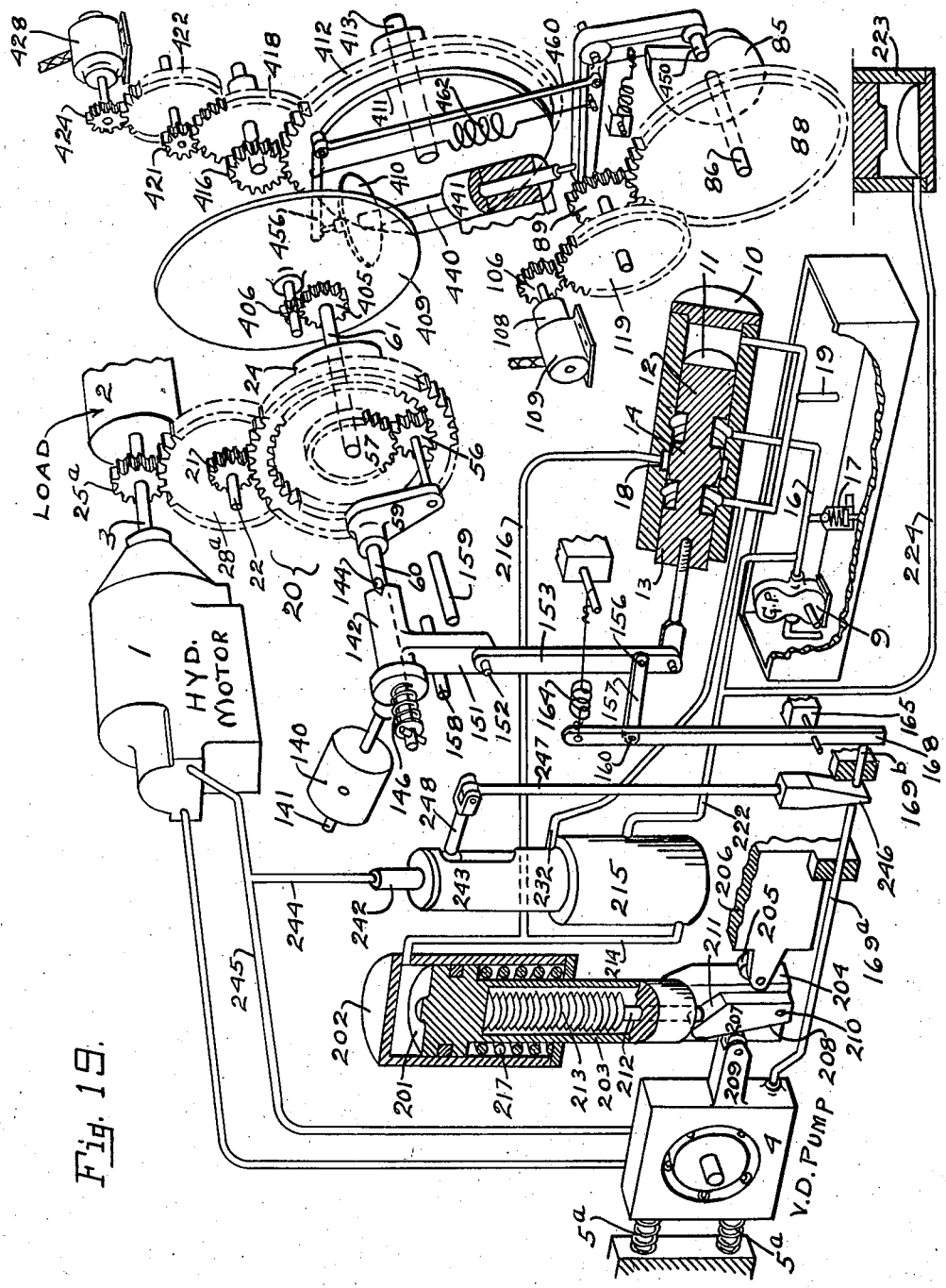

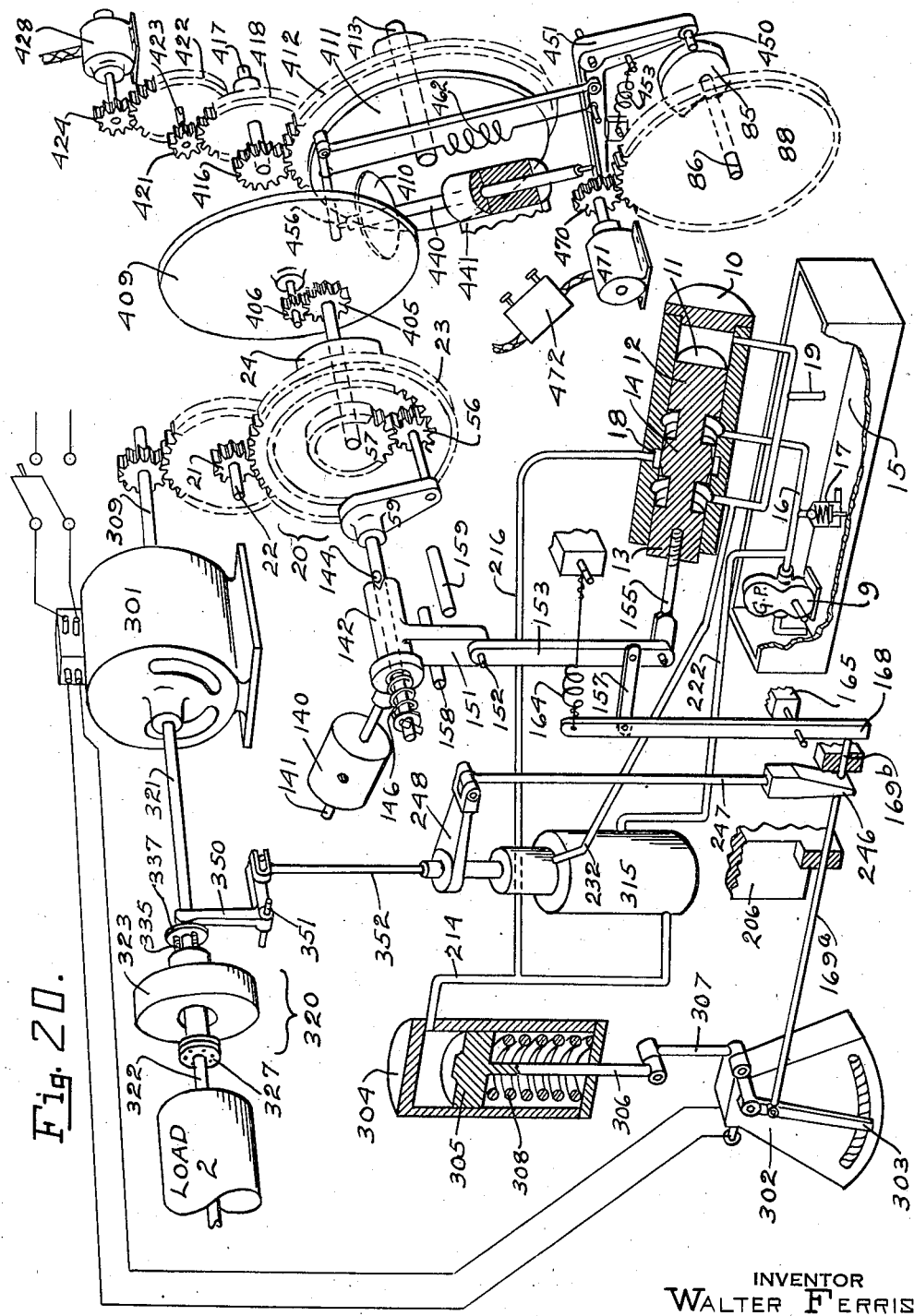

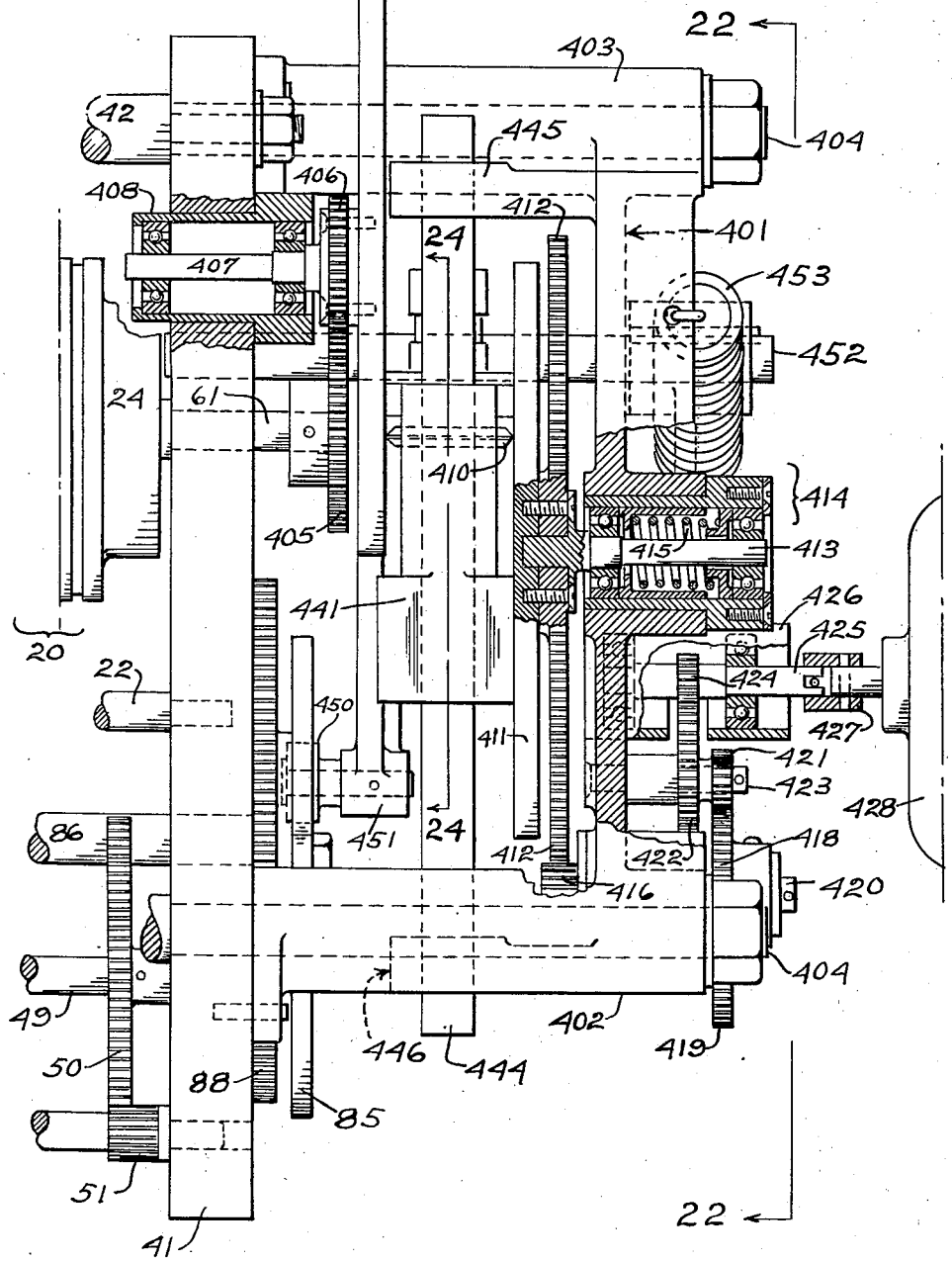

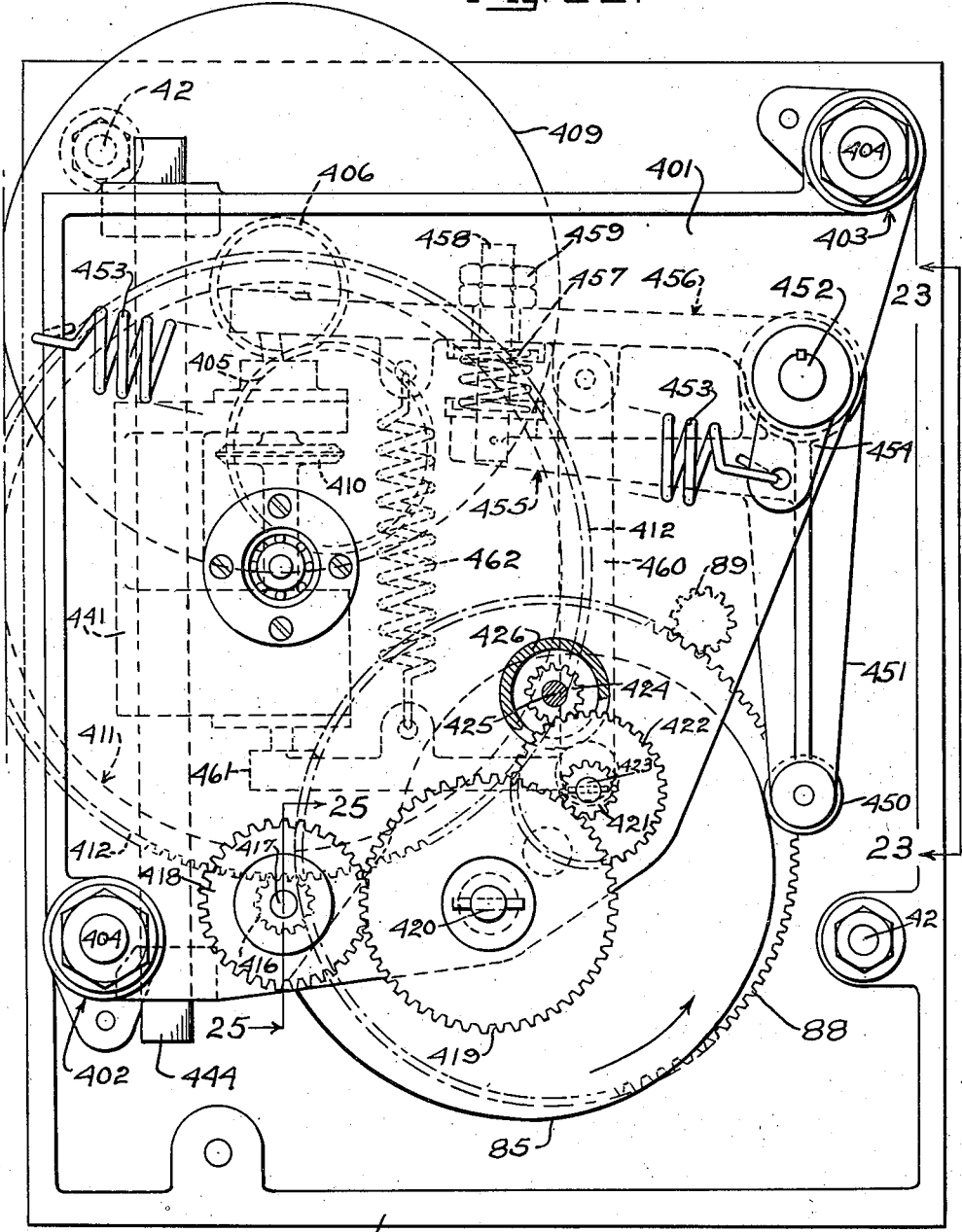

April 23, 1940.  W. FERRIS  2,198,035
SPEED CONTROLLER
Filed Oct. 28, 1935  20 Sheets-Sheet 18
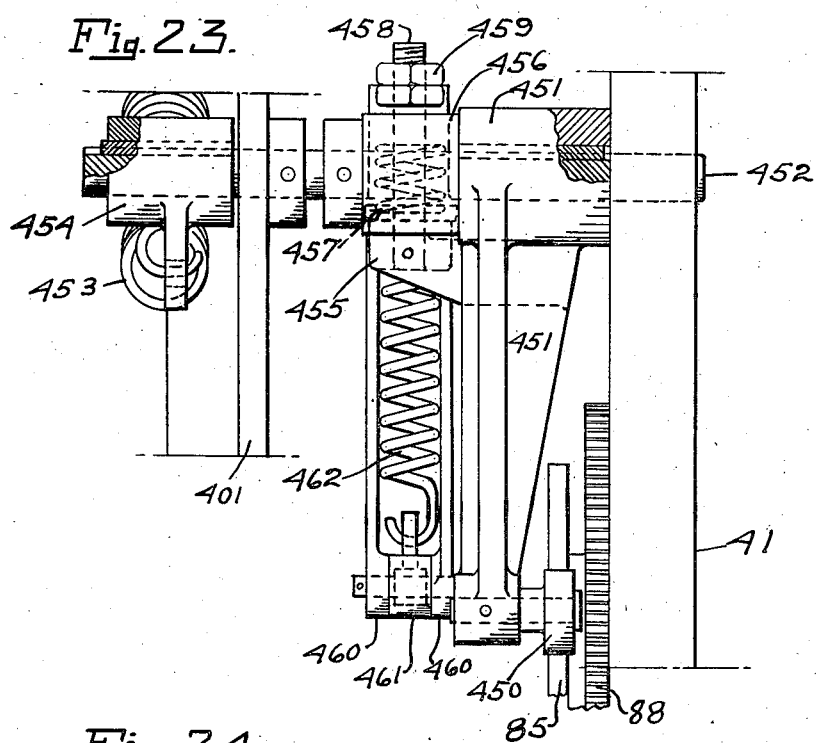
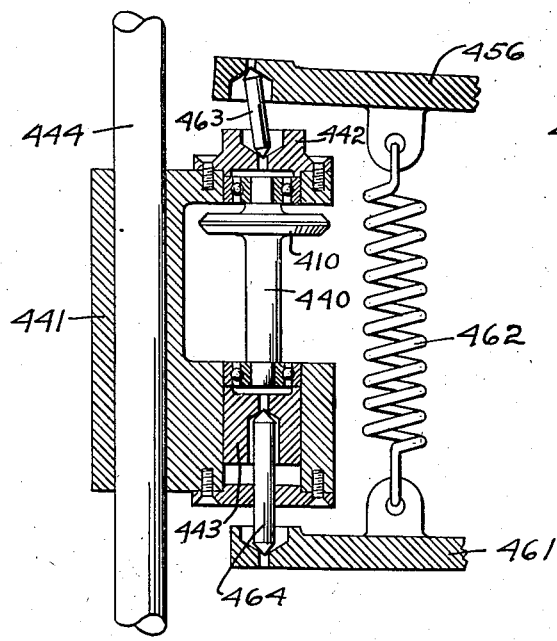
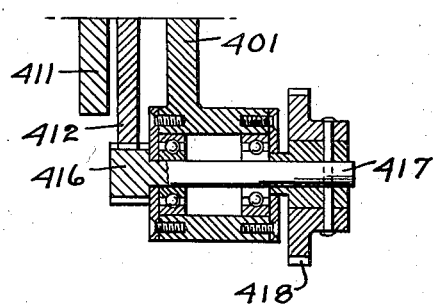
INVENTOR
WALTER FERRIS
BY
ATTORNEY.

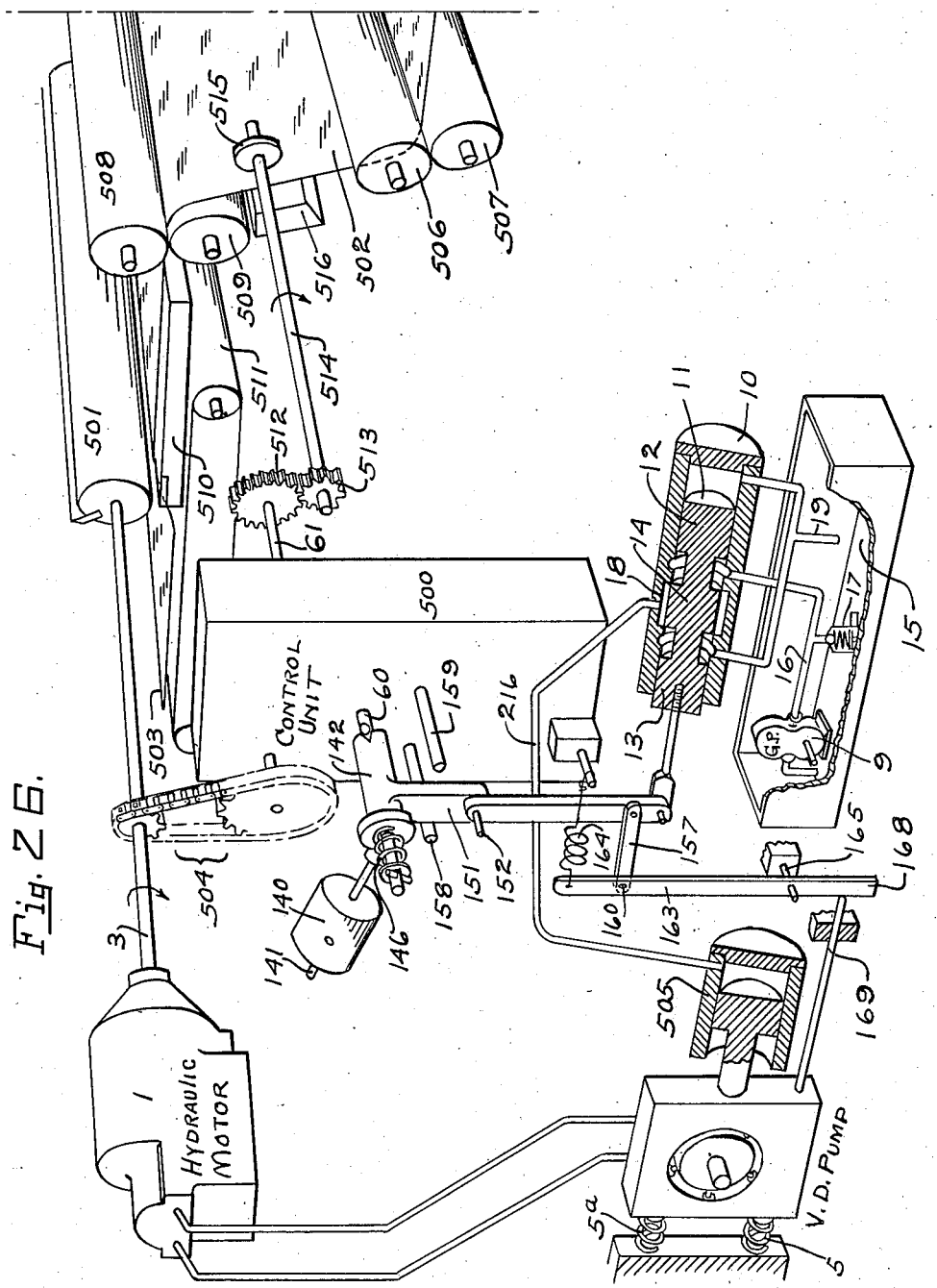

April 23, 1940.   W. FERRIS   2,198,035
SPEED CONTROLLER
Filed Oct. 28, 1935   20 Sheets-Sheet 20

INVENTOR
WALTER FERRIS
BY
ATTORNEY.

Patented Apr. 23, 1940

2,198,035

UNITED STATES PATENT OFFICE 2,198,035

SPEED CONTROLLER

Walter Ferris, Milwaukee, Wis.

Application October 28, 1935, Serial No. 47,008

29 Claims. (Cl. 60—53)

This application is a continuation in part of application Serial No. 704,911 filed January 2, 1934 and since abandoned.

The invention relates to the control of a prime mover which is employed to drive a mechanism or a group of mechanisms at variable or adjustable speeds.

Whatever the power source or the means for regulating the speed, all prior adjustable speed prime movers have one fault in common, namely, that the adjusted speed does not remain constant but is varied by slippage, variations in voltage, variations in deflection of shafts or the like, caused by variations in load or by atmospheric or temperature conditions.

While the invention is capable of controlling the flow from a relatively large source of available energy, such as a steam boiler, hydraulic system or electric power line, to a prime mover which initially translates the energy received into rotary power and which may be designated as a primary prime mover such as a steam engine, water turbine or electric motor, it relates more particularly to the control of a prime mover which may be designated as a secondary prime mover and which is supplied with energy from a generator which is individual to that prime mover and which is driven by power derived from a source of such large capacity that a variation in the load on the individual generator has no material effect thereon so that variations in load will cause only such changes in the speed of the individual generator as are characteristic of the generator itself. A hydraulic motor energized by liquid supplied by a pump individual to that motor and the motor of an electric motor-generator set are examples of secondary prime movers to which the inventor relates in particular.

The present invention has as an object to provide a controller which will maintain the speed of a prime mover more nearly constant or more nearly proportional to a standard speed than has heretofore been possible.

Another object is to provide a controller which will maintain the speed of a prime mover proportional to a standard speed and will vary the standard speed at a predetermined rate or according to a predetermined schedule.

Another object is to provide a speed controller which will adjust a prime mover or regulate the flow of energy thereto in response to a variation in load or a variation in power to compensate for such variations in load or power before it causes a material change in the speed of the prime mover.

Another object is to provide a speed controller which is positive and precise in operation.

Other objects and advantages will appear from the description hereinafter given of the several embodiments of the invention illustrated in the acompanying drawings in which the views are as follows:

Fig. 11 is a detail view of the escapement shown in Fig. 2

Fig. 13 is a vertical section through the surge compensator shown in Fig. 12.

Fig. 14 is a view showing the controller illustrated in Fig. 12 employed to control the speed of an electric motor, the surge compensator being operated in response to variations in the torque of the motor.

Fig. 15 is a vertical section through the surge compensator shown in Fig. 14.

Fig. 16 is a longitudinal section through the torque coupling shown in Fig. 14, the view being taken on the line 16—16 of Fig. 17.

Fig. 17 is a transverse section taken on the line 17—17 of Fig. 16.

Fig. 18 is a longitudinal section taken on the line 18—18 of Fig. 16 with certain parts shown in full.

Fig. 19 is a schematic representation of a controller which is substantially the same as the controller shown in Fig. 12 except that the chronometric mechanism consists of an electric clock motor which drives one leg of a differential through a friction disc transmission.

Fig. 20 is a schematic representation of a controller which is substantially the same as the controller shown in Fig. 14 except that the chronometric mechanism consists of an electric clock motor which drives one leg of a differential through a friction disc transmission.

Fig. 21 is a front view of a variable speed friction disc transmission which is shown schematically in Figs. 19 and 20 and which may be substituted for the pendulum and escapement in the control unit shown in Figs. 8 to 16.

Fig. 22 is a view looking from the right of Fig. 21 as indicated by the line 22—22 of that figure.

Fig. 23 is a detail view taken on a line 23—23 of Fig. 22.

Fig. 24 is a section taken on the line 24—24 of Fig. 21.

Fig. 25 is a section taken on the line 25—25 of Fig. 22.

Fig. 26 is a schematic drawing showing the invention employed to maintain the speed of a prime mover, such as a hydraulic motor, exactly proportional to the speed of a moving body, such as a strip of paper being fed through and cut into predetermined lengths by a paper cutter which is driven by the prime mover.

*Figs. 1 to 11*

Figure 1:
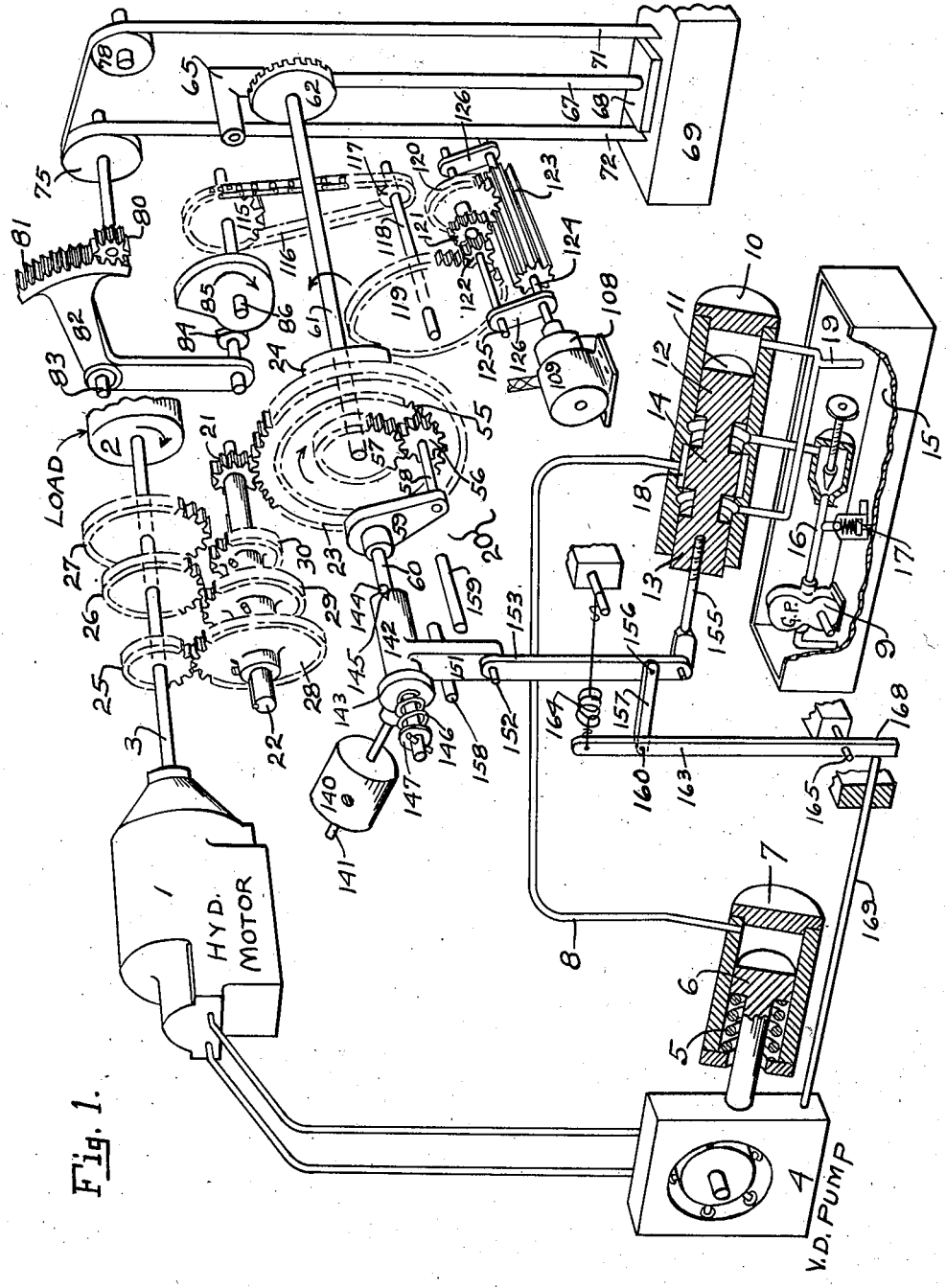
Fig. 1 is a view schematically showing the invention applied to a hydraulic transmission and employed to control the displacement of the pump to thereby maintain the speed of the motor proportional to a standard or desired speed which is measured by a chronometric mechanism having a pendulum.
Figure 2:
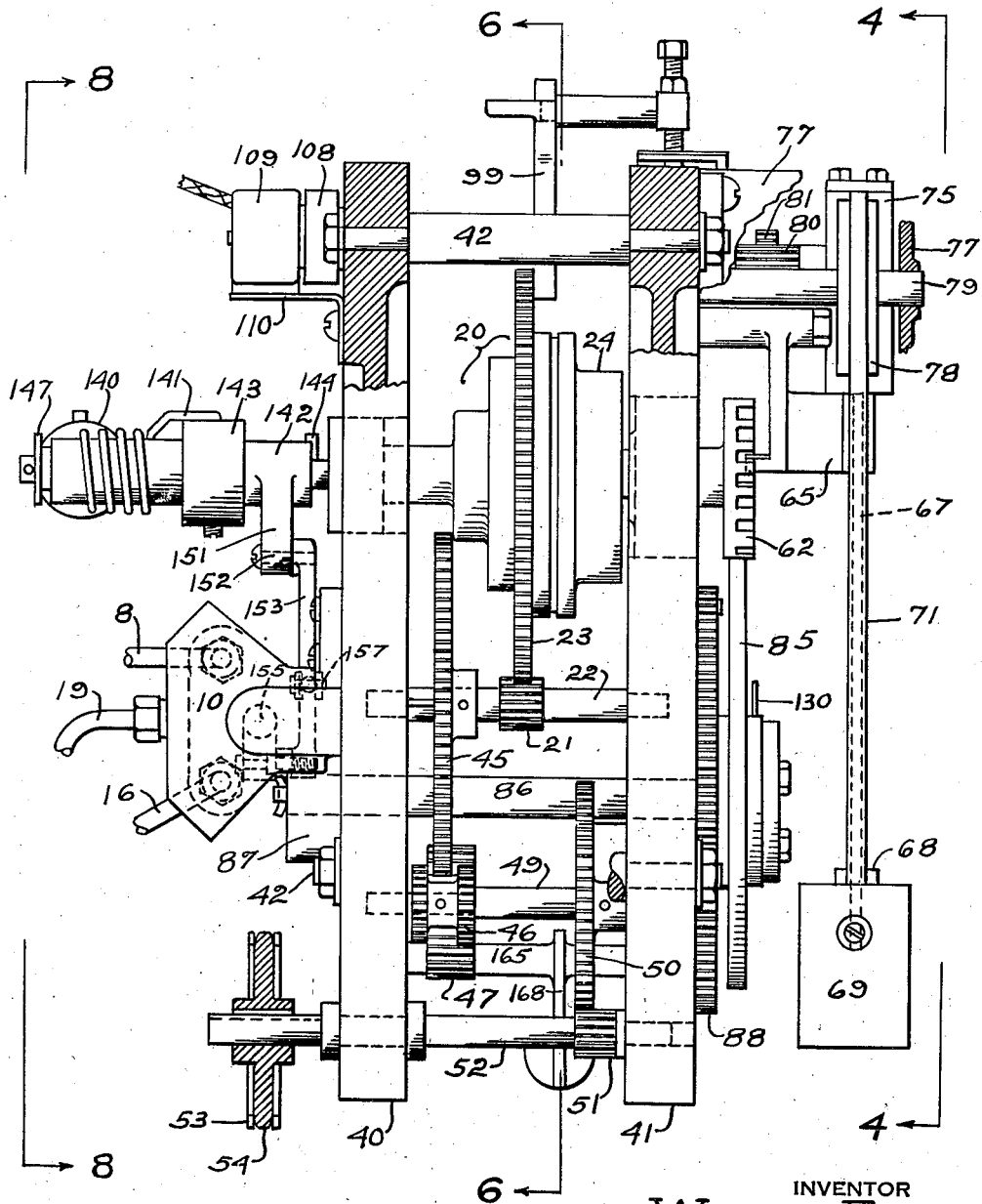
Fig. 2 is a front view of a control unit with certain parts broken away to better illustrate the construction, the view being taken on the line 2—2 of Fig. 3.

Referring first to Fig. 1, the speed controller is shown as being employed to control the speed of a hydraulic motor 1 which drives a load 2 through a shaft 3 and is driven by liquid supplied thereto by a variable displacement pump having a displacement varying element or slide block 4. The speed of the motor 1 is varied by shifting the slide block 4 to vary pump displacement and thereby vary the rate at which liquid is delivered to the motor.

The displacement varying element or slide block 4 is continuously urged toward zero displacement position by a spring 5 and is adapted to be moved toward maximum displacement position against the resistance of the spring 5 by a piston 6 which is arranged in a cylinder and forms therewith and with the spring 5 a servo-motor 7 which functions to vary pump displacement.

Figure 12:
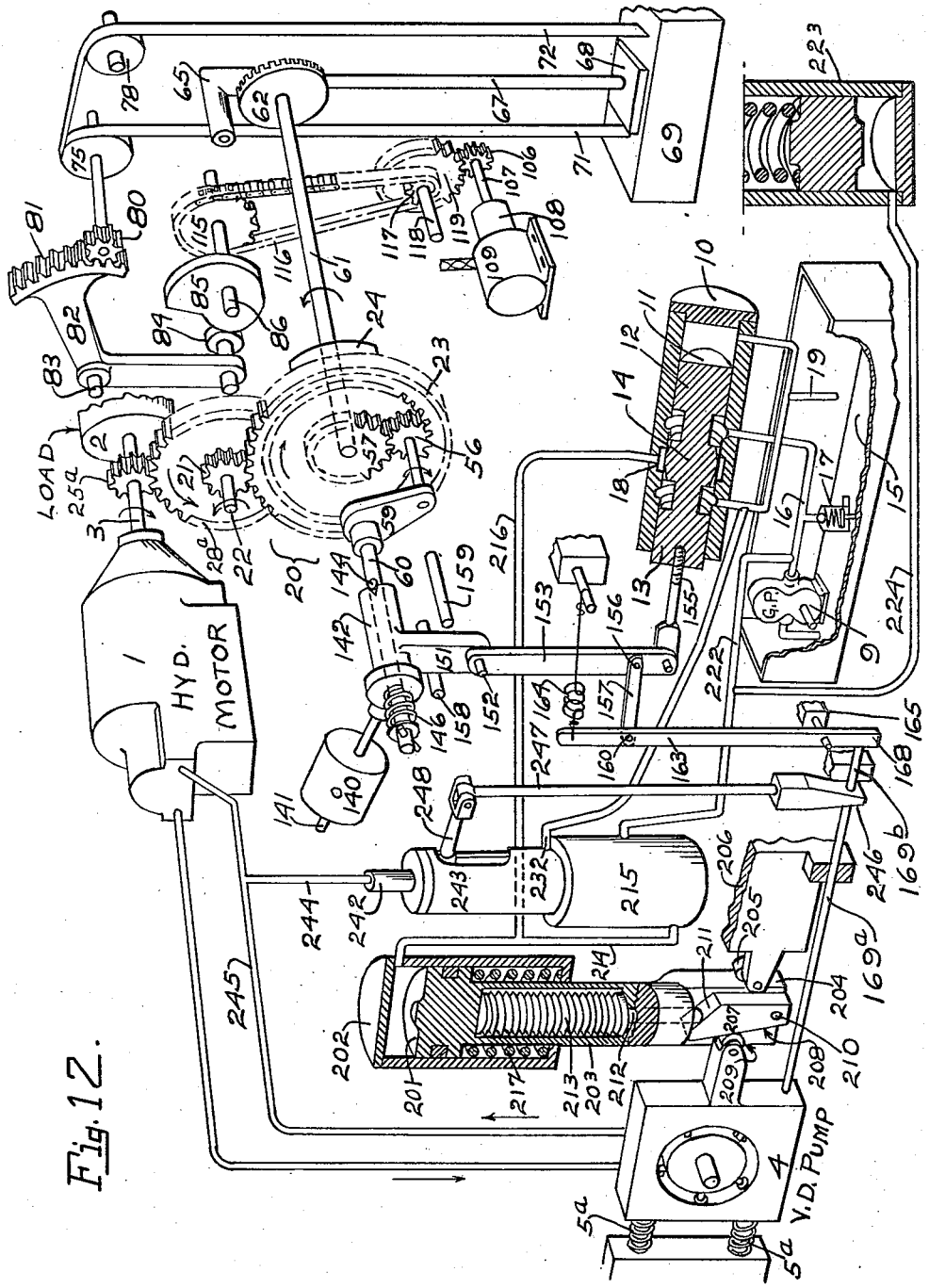
Fig. 12 is a schematic representation of a controller which differs from the controller shown in Fig. 1 in that it is additionally provided with a surge compensator which varies pump displacement in response to variations in fluid pressure above and below a predetermined pressure.

The spring 5 is shown arranged in the cylinder and acting upon the piston 6 but, in practice, the spring or springs ordinarily act directly upon the slide block, as shown in Fig. 12, and react against the pump casing (not shown). Regardless of whether the spring or springs act upon the slide block or upon the piston, the spring or springs and the piston and cylinder constitute a servo-motor and will be referred to herein as such.

The servo-motor 7 is operated by liquid supplied thereto through a pipe 8 from a suitable source, such as a gear pump 9, under the control of a pilot valve 10. The flow of liquid through the pilot valve 10 is controlled by a plunger 11 which is closely fitted in the valve casing and reduced in diameter at two points intermediate its ends to form end heads or pistons 12 and 13 and a center head or piston 14 which is spaced from the end heads.

The gear pump 9 draws liquid from a reservoir 15 and discharges it into a pipe 16 which is connected to the pilot valve 10 at a point between the heads 12 and 14. The pipe 16 may also be connected to the variable displacement pump in order that the gear pump may supply liquid for supercharging the variable displacement pump but this arrangement has not been illustrated as it would complicate the view and as it is common practice to employ a gear pump for supercharging a power pump. All liquid discharged by the gear pump in excess of requirements is exhausted into the reservoir 15 through a relief valve 17 which is connected to the pipe 16 intermediate the ends thereof and which enables the gear pump to maintain a uniform pressure in the pipe 16.

The pipe 8 is connected to a port 18 which is formed in the casing of the pilot valve 10 and is normally covered or substantially covered by the head 14 so that a slight movement of the plunger 11 in one direction or the other will open or increase communication between it and the pipe 16 or between it and a drain pipe 19 which discharges into the reservoir 15 and is connected to the pilot valve casing at a point between the heads 13 and 14. The drain pipe 19 is also connected to the end of the pilot valve casing to permit the plunger 11 to reciprocate freely.

The head 14 is shown as being exactly the same width as the port 18 so that the slightest movement of the plunger 11 toward the left will permit liquid to flow from the gear pump to the servo-motor 7 and cause it to increase pump displacement, and the slightest movement of the plunger 11 toward the right will open the pipe 8 to the drain pipe 19 and permit liquid to escape from the servo-motor 7 so that it may decrease pump displacement.

In practice, however, the pilot valve plunger ordinarily has a negative lap in respect to port 18. That is, head 14 is either made very slightly narrower than port 18 or it is made slightly wider than the port 18 and then shaded as by having a plurality of fine tapered grooves formed around its periphery at each of its ends as shown in Fig. 12 so that, when the plunger 11 is in its central or neutral position, the port 18 communicates with both the pipe 16 and the pipe 19 and there is a very slight flow or seepage from the pipe 16 to the pipe 19.

If the head 14 is provided with grooves, a slight movement of the plunger 11 toward the left will increase the flow into the port 18 and decrease the flow therefrom so that liquid will flow through the pipe 8 and operate servo-motor 7, and a slight movement of the plunger 11 toward the right will decrease the flow into the port 18 and increase the flow therefrom so that liquid may escape from the servo-motor 7 and permit it to decrease pump displacement.

In either case, the pressure in the pipe 8 is lower than the pressure in the pipe 16 due to the liquid being throttled as it passes between the edge of the head 14 and the edge of the port 18.

Motion is imparted to the plunger 11 of the pilot valve 10 through a differential 20 which has one of its legs driven at a speed exactly proportional to the speed of the shaft 3. The second leg of the differential is driven at a speed which is exactly proportion to a standard or desired speed and which is measured by the chronometric mechanism shown in Figs. 2 to 11. The third or output leg of the differential is connected through intervening mechanism to the pilot valve plunger 11 so that any deviation in the speed of the shaft 3 from the desired speed results in movement of the third or output leg of the differential and a consequent shifting of the pilot valve plunger 11.

Motion is transmitted from the shaft 3 to the differential 20 through a pinion 21 which is fixed upon a countershaft 22 and meshes with a gear 23 fixed to the case 24 of the differential. If the second leg of the differential is connected to a chronometric mechanism as shown in Fig. 1, the gear 23 is driven at a very slow speed by employing a plurality of reduction gears and a chain and sprocket wheel drive as shown in Figs. 2 to 11.

For the purpose of illustration, however, the countershaft 22 is shown in Fig. 1 as being driven from the shaft 3 through a set of change speed gears of which gears 25, 26 and 27 are fixed upon the shaft 3 and gears 28, 29 and 30 are splined upon the countershaft 22 and adapted to be meshed selectively with the gears on the shaft 3. The change speed gears shown in Fig. 1 have been omitted from the other views for the purpose of simplifying the same and for the reason the change speed gears may be readily added to the mechanisms shown in the other views without material changes thereto.

The differential 20 forms a part of the control unit shown in Figs. 2 to 11. This unit has its mechanism carried by a frame having two side plates 40 and 41 which are spaced apart by four shouldered bolts 42 and connected to each other thereby. The unit is ordinarily arranged within and supported by a housing which has been omitted from the drawings in order to simplify the same.

The countershaft 22 and the differential case 24 are journaled at the ends thereof in suitable bearings formed in or carried by the frame, the differential case 24 being shown provided with two bearings 43 and 44 (Fig. 9) which are fixed, respectively, in the side plates 40 and 41. The countershaft 22 has a gear 45 splined thereon and adapted to be moved manually into mesh with either a driving pinion 46 or an idler gear 47 in order that the differential case 20 may be rotated in the same direction regardless of the direction in which the prime mover is operated.

The idler gear 47 is journaled upon a stub shaft 48 (Fig. 10) which is rigidly secured to the side plate 40. The pinion 46 is fixed upon a shaft 49 (Figs. 2, 6 and 9) and provided with two spaced apart sets of gear teeth one of which is always in mesh with idler gear 47 and the other of which may be engaged by the gear 45.

The shaft 49 is journaled in the side plates 40 and 41 and has a gear 50 fixed thereon and in mesh with a pinion 51 fixed upon a shaft 52 which also is journaled to the side plates 40 and 41. The shaft 52 is driven at a speed proportional to the speed of the prime mover, as by being connected thereto by means of a chain 53 which engages sprocket wheel 54 fixed on the outer end of the shaft 52.

When the shaft 52 is rotated by a prime mover, the differential case 24 will be rotated at a much slower speed through the gear train described above. If the gear 45 is in mesh with the idler gear 47 as shown and the prime mover rotates the shaft 52 in a direction which would cause the differential case 24 to be rotated in the wrong direction, it is simply necessary to move the gear 45 out of mesh with the gear 47 and into mesh with the pinion 46.

The differential case 24 has a ring gear 55 (Figs. 6 and 9) fixed between the two parts thereof and in mesh with a planet pinion 56 which also meshes with a sun gear 57. The planet pinion 56 is journaled upon a stud 58 threaded to an arm 59 which is fixed upon the inner end of a shaft 60 and extends at right angles therefrom.

The shaft 60 extends through and beyond the side plate 40 and is journaled in suitable bearings which are shown as ball bearings arranged in the differential case 24 and in the bearing 43 respectively.

The sun gear 57 is fixed upon the inner end of a shaft 61 journaled in suitable bearings which are shown arranged in the arm 59 and in the bearing 44 respectively. The shaft 61 extends through and beyond the side plate 41 and has an escape wheel 62 fixed upon its outer end. The escape wheel 62 forms part of a chronometric mechanism which controls or measures the speed of the shaft 61 and which will be presently described.

When the escape wheel 62 is permitting the shaft 61 and the gear 57 to rotate at a measured speed, if the gear case 24 is rotated in the opposite direction at a speed which has the same ratio to the speed of the shaft 61 that the pitch diameter of the ring gear 55 has to the pitch diameter of the sun gear 57, the axis of the planet pinion 56 will remain stationary and no movement will be imparted to the shaft 60.

If the speed of the ring gear 55 should increase or if the speed of the sun gear 57 should decrease, the planet pinion 56 would be carried around by the ring gear 55 and thereby rotate the shaft 60 in the direction of rotation of the gear 55. Conversely, if the speed of the ring gear 55 should decrease or if the speed of the sun gear 57 should increase, the planet pinion 56 would be carried around by the sun gear 57 and thereby rotate the shaft 60 in the direction of rotation of the gear 57.

Rotation of the differential case 24 and its ring gear 55 rotates sun gear 57 and hence tends to rotate both of the shafts 60 and 61 but, as will be presently explained, the shaft 60 is yieldingly restrained from rotation so that the shaft 61 is rotated. The speed of the shaft 61 is controlled by chronometric mechanism of which the escape wheel 62 forms a part.

The teeth of the escape wheel 62 are engaged by two pallets 63 and 64 extending from opposite sides of an escape lever 65 which is pivoted above the escape wheel 62 upon a pivot 66 fixed to the side plate 41.

A stiff rod 67 has its upper end fixed to the escape lever 65 and its lower end freely fitted in and slidable through a hole formed in a plate 68 which is fixed to a pendulum bob 69 in alignment with a passage 70 into which the rod 67 extends. The pendulum bob 69 is supported for oscillation by two thin and flexible metal bands or ribbons 71 and 72 which are fastened thereto at opposite ends of the plate 68.

The end or contact face on the pallet 63 is inclined outward and downward, and the end or contact face on the pallet 64 is inclined inward and downward as shown in Fig. 11. That is, the outer ends of the pallets are beveled or inclined in the same direction in respect to the direction in which the escape wheel 62 is rotated as indicated by the arrow shown in Fig. 11.

The arrangement is such that the chronometric mechanism is self starting for the reason that, when power is applied to the shaft 61 to rotate the escape wheel 62, a tooth on the right side of the escape wheel 62 in respect to Fig. 11 will act upon the beveled end of the pallet 63 and force the escape lever 65 toward the left, thereby causing the rod 67 to swing the pendulum bob 69 toward the left. Then, a tooth on the left side of the escape wheel will act upon the beveled end of the pallet 64 and force the escape lever 65 toward the right, thereby causing the rod 67 to swing the pendulum bob 69 toward the right where it is again urged toward the left by a tooth on the escape wheel engaging the beveled end of the pallet 63.

The cumulative effect of a few of such impulses causes the pendulum bob to swing through its normal arc and then the pendulum is kept swinging by slight impulses imparted to the escape lever by the teeth of the escape wheel passing over the beveled ends of the pallets.

The metal ribbons 71 and 72, which support the pendulum bob 69, have the upper ends thereof fastened to a winding drum 75 which is arranged upon a shaft 76 (Fig. 3) having one of its ends supported by the side plate 41 and its other end supported in the web of a U-shaped sub-frame 77 which has its ends fastened to the side plate 41. The ribbon 72 extends vertically downward from the periphery of the drum 75 (Fig. 4) while the ribbon 71 extends over a deflector drum 78 and then vertically downward from the periphery thereof. The deflector drum 78 is arranged upon a shaft 79 having one of its ends supported by the side plate 41 and its other end supported by the sub-frame 77.

The winding drum 75 has a pinion 80 fixed thereto and in mesh with a segmental gear 81 formed upon the upper end of a bell crank lever 82 which is carried by a shaft 83 having the ends thereof supported by the side plate 41 and the sub-frame 77. A roller 84, carried by a pin fixed in the lower end of the lever 82, is urged against a cam wheel 85 by the weight of the pendulum bob 69 acting through the ribbons 71 and 72, drum 75, gears 80 and 81 and lever 82. The cam wheel 85 is fixed upon one end of a shaft 86 which extends through and is journaled in the side plates 40 and 41 and has its other end connected to one end of a torsion spring 87 (Fig. 8) the other end of which is fastened to the side plate 40.

The arrangement is such that, when the cam wheel 85 is rotated, the lever 82 will be swung on its pivot and the segmental gear 81 will rotate the pinion 80 and the winding drum 75 to raise or lower the pendulum bob 69 depending upon the direction in which the cam wheel is rotated. As shown, the cam wheel 85 is adapted to be rotated at a very slow speed in the direction of the arrow on Fig. 4, thereby swinging the lower end of the lever 82 outward and causing the segmental gear 81 to rotate the pinion 80 and the drum 75 in a direction to raise pendulum bob 69 through a given distance during a given period of time, for instance, to raise the bob from the position shown in Fig. 4 to the position shown in Fig. 5 during a period of six hours.

After the bob 69 has been raised, it may be lowered by disengaging certain gears, as will be presently explained, and then the bob may be moved downward by its own weight, the spring 87 assisting the bob to rotate the several gears and shafts.

The cam 85 is rotated by a gear 88 (Figs. 4, 5 and 7) fixed to the shaft 86 and in mesh with a pinion 89 fixed to one end of a shaft 90 which extends through and is journaled in side plates 40 and 41. The shaft 90 has a gear 91 journaled thereon (Fig. 7) and urged by a spring 92 against a friction disc 93 which is fixed to the shaft 90 and forms with the gear 91 and the spring 92 a friction clutch to prevent damage to the mechanism should it stall as by the bob 69 being raised too high.

The gear 91 meshes with a pinion 94 fixed on a shaft 95 which is journaled in the side plates 40 and 41 and has a gear 96 fixed thereon. The gear 96 meshes with a gear 97 journaled upon a stub shaft 98 carried by a release lever 99 (Figs. 3, 5 and 6) which has a trunnion 100 fixed thereto intermediate the ends thereof and journaled in the side plate 41. The trunnion 100 is held in the side plate 41 by a keeper plate 101 which is bolted to the side plate 41 and fitted in a groove 102 formed in the trunnion.

The gear 97 meshes with a gear 103 which has a gear 104 fixed for rotation therewith and is journaled upon a stub shaft 105 carried by the release lever 99 at the rear end thereof. The gear 104 meshes with a pinion 106 fixed upon a shaft 107 which has one end thereof journaled in the release lever 99 upon the axis of the trunnion 100 so that the release lever may be pivoted upon the trunnion 100 without altering the position of the pinion 106.

Figure 3:
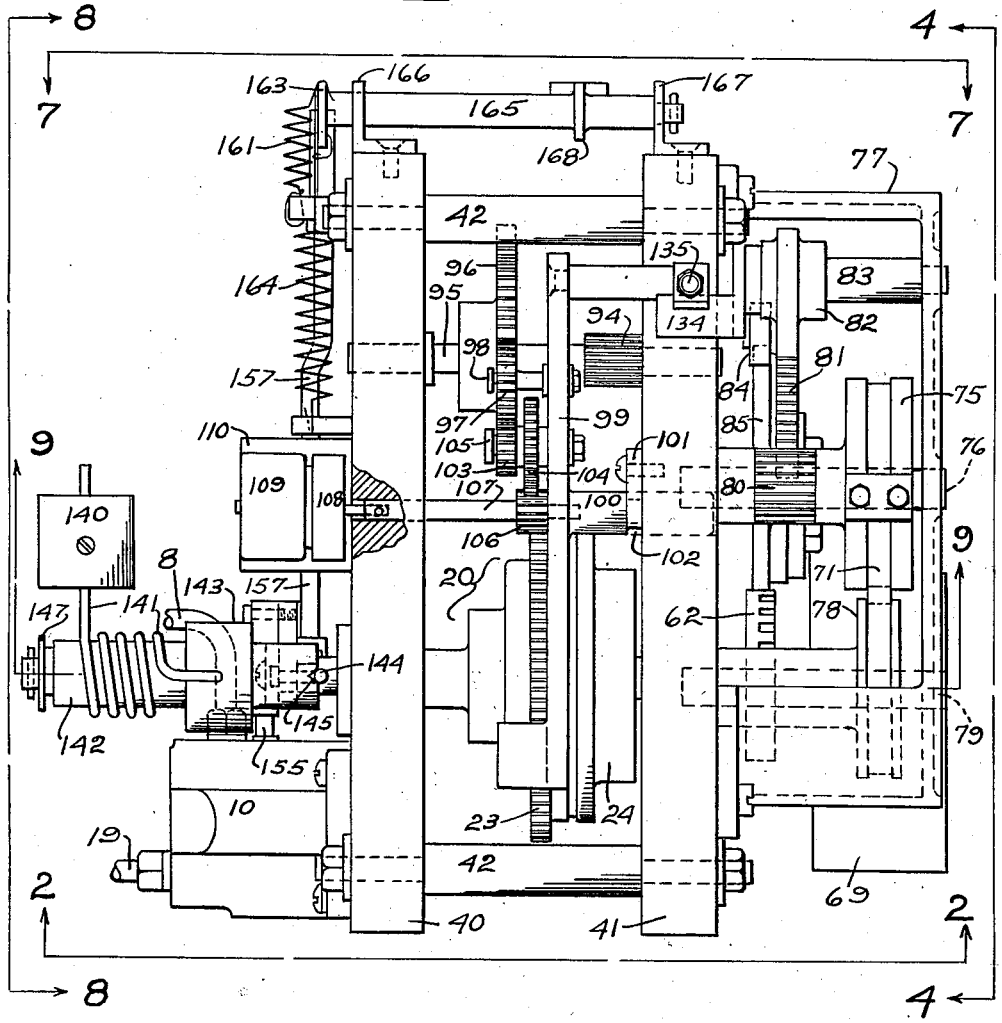
Fig. 3 is a top plan view of the control unit, certain parts being broken away to expose other parts.
Figure 10:
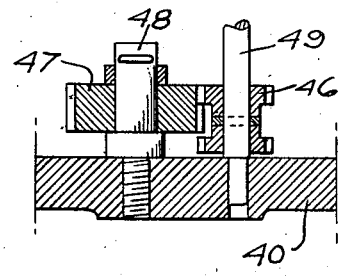
Fig. 10 is a section taken on the line 10—10 of Fig. 8.
Figure 9:
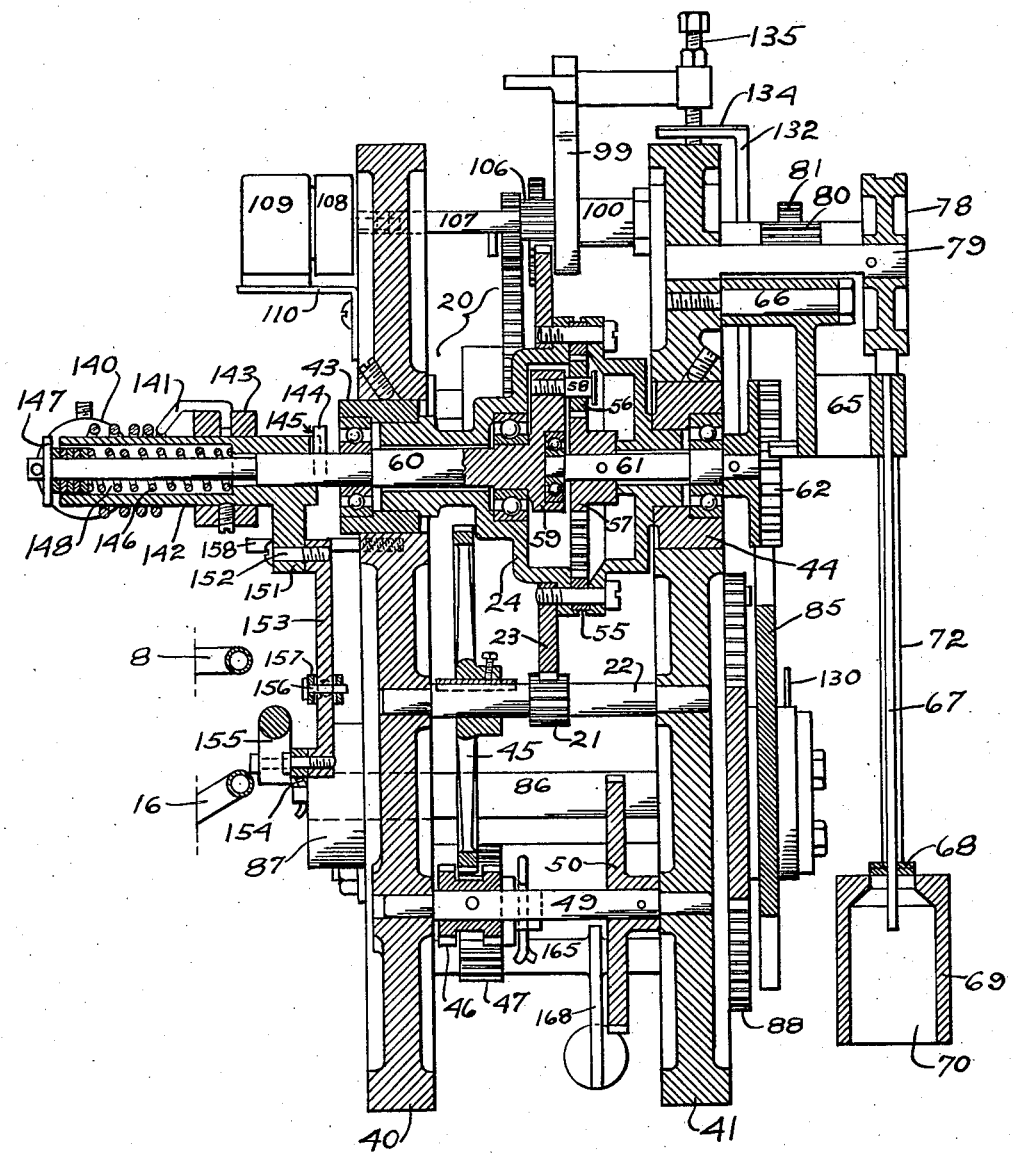
Fig. 9 is a vertical section taken in the plane indicated in each of Figs. 3 and 8 by a line 9—9.

The shaft 107 is shown in Figs. 3 and 9 as being connected through a reduction gearing 108 to a synchronous electric motor 109 which is supported upon a bracket 110 fastened to the side plate 40. The reduction gearing 108 and the motor 109 are ordinarily combined into a single unit which may be obtained in the open market from the manufacturers of electric clocks.

In practice, however, it is sometimes desirable to vary the speed of the cam wheel 85 to thereby vary the length of time required to raise the pendulum bob 69 through a given distance. This may be accomplished by inserting change speed gears at any convenient point in the gear train, for instance, by supporting change speed gears up on the release lever 99.

Change speed gears have been omitted from Figs. 2 to 9 in order to avoid complicating the views but, in Fig. 1, the above described gear train between the shaft 86 and the reduction gearing 108 has been replaced by a chain drive and a set of change speed gears. Shown in Fig. 1, a sprocket wheel 115 is fixed to the shaft 86 and connected by a chain 116 to a sprocket 117 which is fixed upon a shaft 118 having a gear 119 fixed thereon.

The gear 119 is adapted to mesh with any one of three gears 120, 121 and 122 which are of different diameters and are fixed for rotation with each other. The gear 120 meshes with a wide faced pinion 123 fixed on a shaft 124 which is connected to the reduction gearing 108 and corresponds to the shaft 107 shown in Figs. 3 and 9. The gears 120, 121 and 122 are splined upon a shaft 125 journaled in two link bearings 126 which are pivoted upon the shaft 124 at opposite ends of the pinion 123 and which permit the shaft 125 to be swung outward to disengage the gears and then the gear 120 may be moved along the pinion 123 to bring it, the gear 121 or the gear 122 into mesh with the gear 119.

Figure 4:
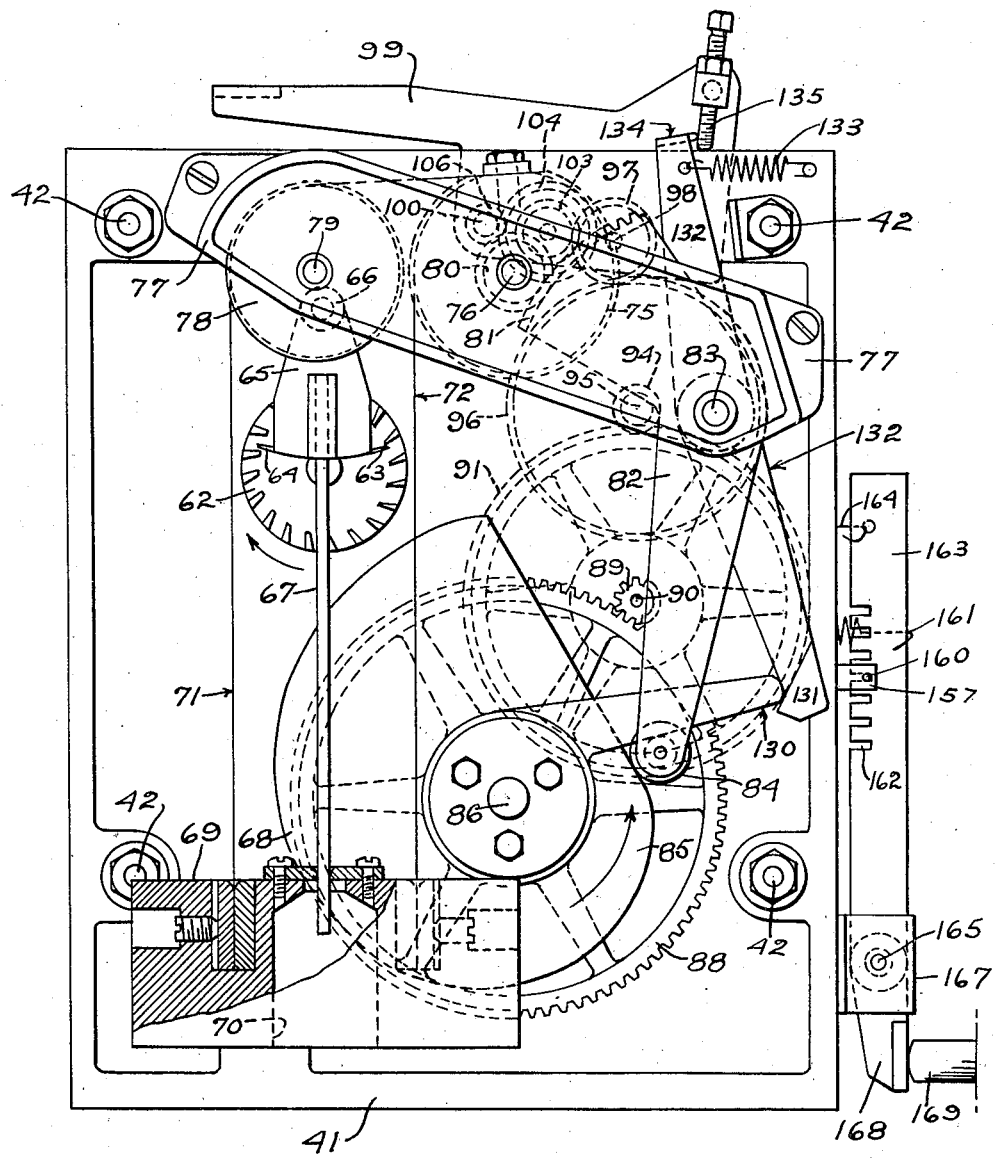
Fig. 4 is a view looking from the right of Fig. 2 as indicated by the line 4—4 of Figs. 2 and 3.

When the motor 109 is energized, it will rotate the shaft 86 through the intervening mechanism, thereby rotating the cam 85 which will swing the lower end of the lever 82 rearward or toward the right in respect to Fig. 4. The segmental gear 81 on the upper end of the lever 82 will rotate the pinion 80 and thereby rotate the winding drum 75 which will wind up the ribbons 71 and 72 to gradually raise the pendulum bob 69.

After the pendulum bob has been raised, it may be lowered by depressing the front end of the release lever 99 to raise the rear end thereof and thereby move the gear 97 out of mesh with the gear 96. Then the weight of the pendulum bob 69 and the force of the torsion spring 87 will be able to rotate the several shafts and gears so that the pendulum bob 69 may descend. In order to stop the pendulum bob at a predetermined point in its downward travel, a stop arm 130 (Figs. 4, 5 and 7) is fastened to the cam wheel 85 and adapted to engage the hub 84ª of the roller 84 on the lower end of the lever 82, thereby stopping the descent of the pendulum bob and causing the several shafts and gears to cease rotating.

Just as the stop arm 130 is about to engage the hub 84ª, the free end thereof engages a cam 131 arranged upon the lower end of a lever 132 which is pivoted intermediate its ends to the side plate 41. The upper end of the lever 132 is urged rearward by a spring 133 but it is normally restrained from rearward movement by a flange 134 arranged at its upper end and normally engaging a stop 135 which is carried by the rear end of the release lever 99 and engages the top of the side plate 41 to limit the downward movement of the rear end of the release lever 99 to thereby enable the gear 97 to mesh properly with the gear 96.

Figure 5:
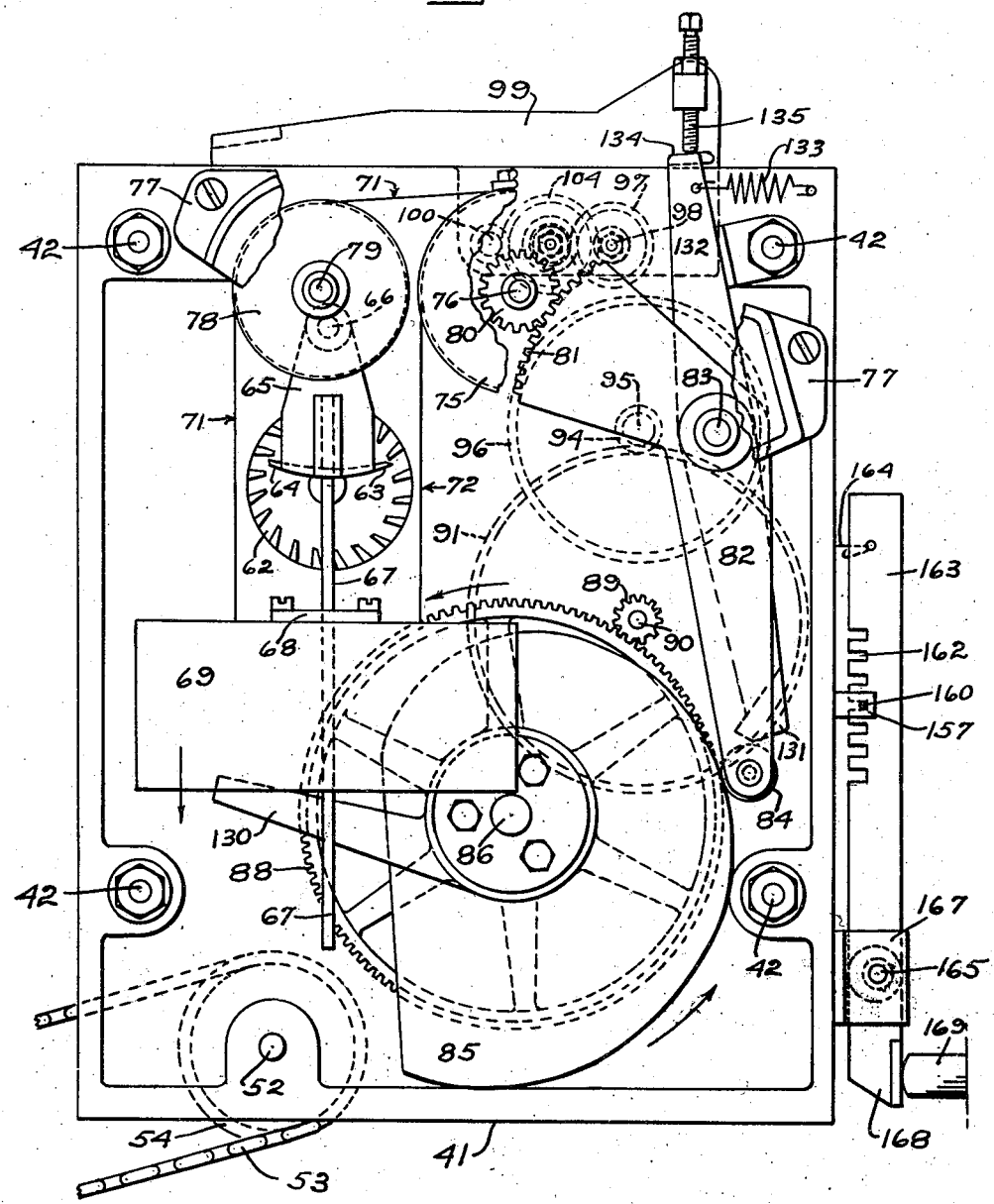
Fig. 5 is a view similar to Fig. 4 but with certain parts broken away and showing the pendulum in a different position.
Figure 6:
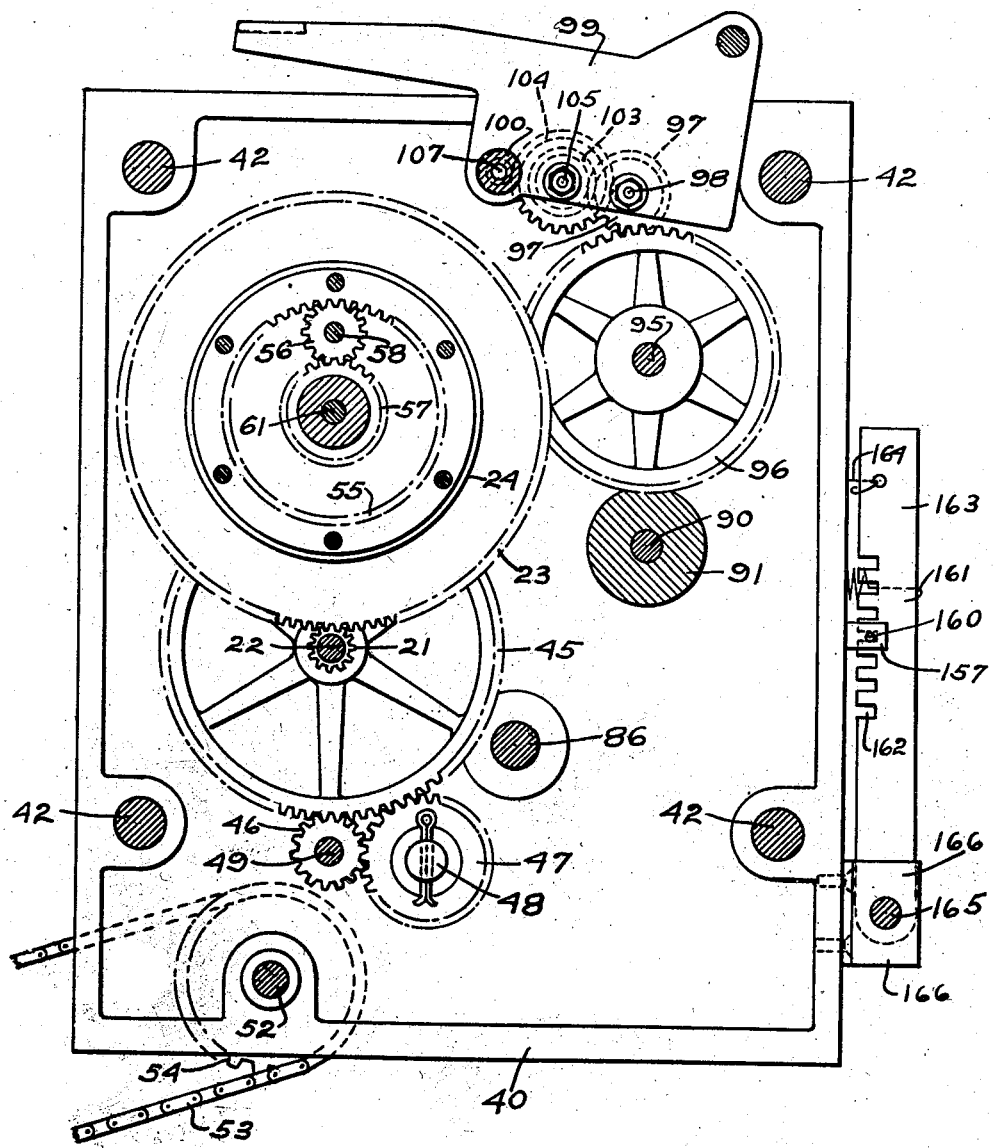
Fig. 6 is a vertical section taken on the line 6—6 of Fig. 2.
Figure 7:
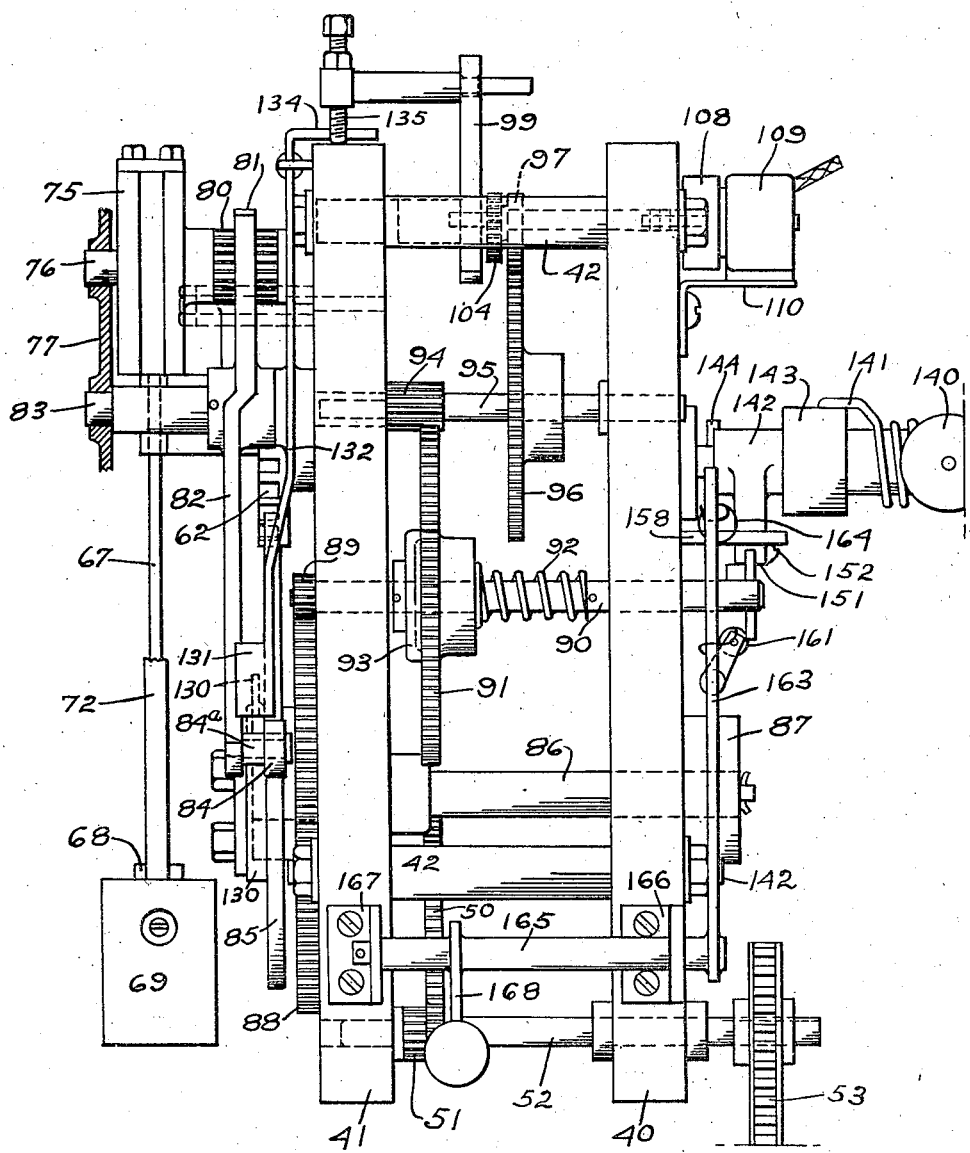
Fig. 7 is a rear elevation of the control unit as indicated by the line 7—7 of Fig. 3.
Figure 8:
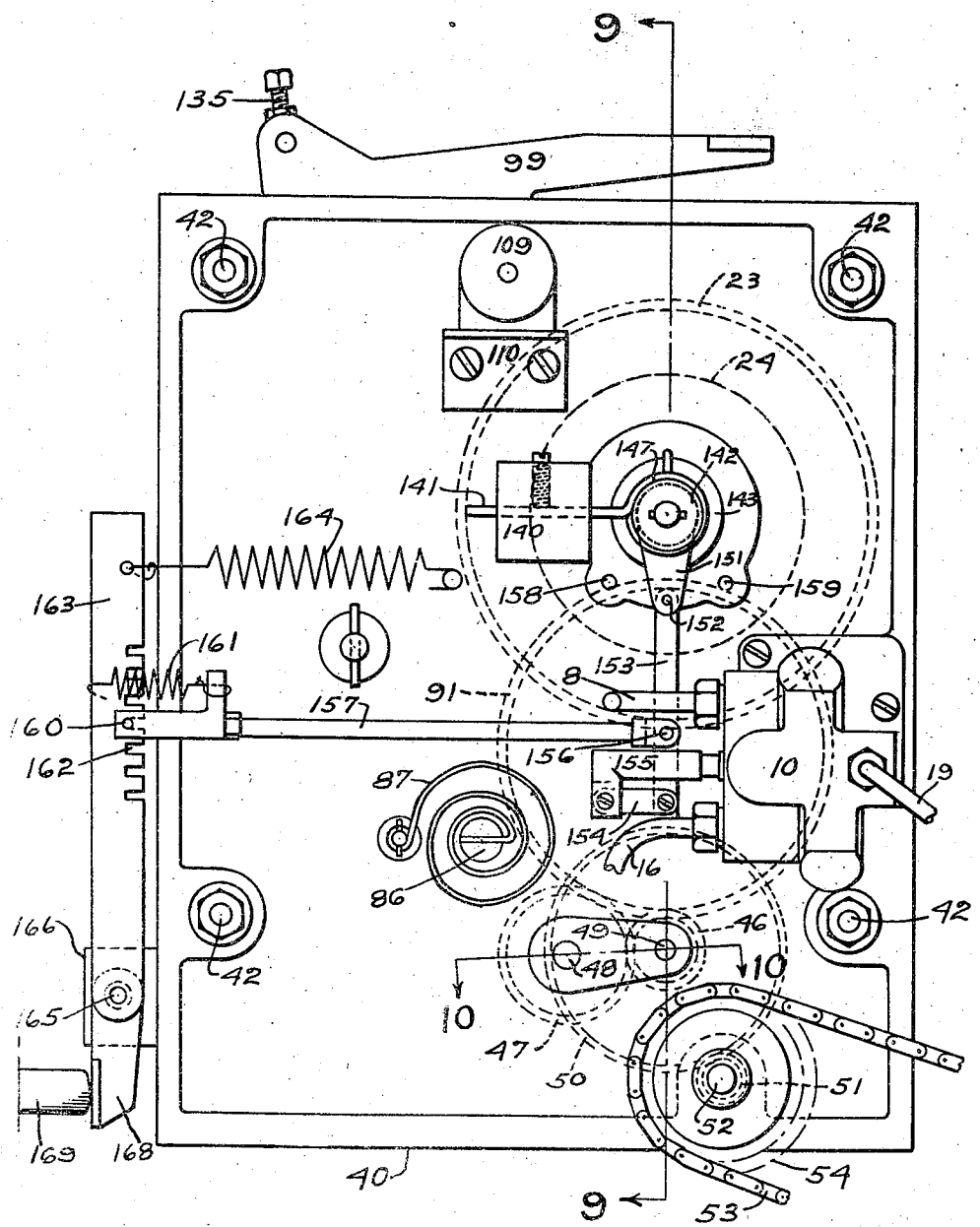
Fig. 8 is a view looking from the left of Fig. 2, as indicated by the line 8—8 of Figs. 2 and 3.

When the release lever 99 has its front end depressed, it will swing upon the trunnion 100 and raise the gear 97 out of mesh with the gear 96 and it will simultaneously raise the stop 135 out of engagement with the flange 134 so that the spring 133 may move the upper end of the lever 132 rearward or from the position shown in Fig. 4 to the position shown in Fig. 5. The lever 99 may then be released and the weight of the gears will cause the rear end thereof to fall, but the stop 135 will engage the flange 134 and arrest further downward movement of the rear end of the release lever 99 to hold the gear 97 out of mesh with the gear 96.

As the pendulum bob 69 moves downward, it and the spring 87 will rotate the several shafts and gears and thereby cause the stop arm 130 to revolve about the axis of the shaft 86. When the pendulum bob 69 approaches the limit of its downward movement, the stop arm 130 will engage the cam 131 and swing the cam lever 132 from the position shown in Fig. 5 to the position shown in Fig. 4, thereby moving the flange 134 from under the stop 135 and permitting the rear end of the release lever 99 to fall and the gear 97 to again mesh with the gear 96.

Just as the flange 134 moves from under the stop 135, the stop arm 130 engages the hub 84ª and stops further descent of the pendulum bob so that the gear 96 ceases to rotate before the gear 97 meshes therewith. In practice, a dashpot is employed to retard the movement of the release lever 99 but it has been omitted from the drawings in order to avoid complicating the views.

The turning moment, which shaft 61 imparts to escape wheel 62 and which through pallets 63 and 64 energizes the pendulum, is derived from a weight 140 (Fig. 8) arranged in adjusted position upon a horizontal part of a slightly resilient rod 141 which has the other part thereof formed in a spiral around a sleeve 142 (Fig. 9) journaled upon shaft 60.

The free end of the spiral part of the rod 141 is fastened to a collar 143 which is arranged upon the sleeve 142 and fixed for rotation therewith. The sleeve 142 forms a part of a safety snap clutch and is caused to rotate with the shaft 60 by a pin 144 which is fixed in the shaft 60 and arranged in a notch 145 formed in the sleeve 142 at the inner end thereof.

The sleeve 142 is urged toward the pin 144 by a helical compression spring 146 which encircles the outer part of the shaft 60 between an abutment 147 on the end of the shaft and the inner end of a counterbore 148 which is formed in the sleeve 142 and encloses the spring 146.

The weight 140 imparts a turning moment through sleeve 142 and pin 144 to shaft 60 which delivers the turning moment through pin 58 to planet pinion 56, producing a tooth reaction at one side of this pinion against ring gear 55, and at the opposite side against sun gear 57 which drives shaft 61 and escape wheel 62 as above stated.

The rotation of motor shaft 3 causes continuous rotation of sun gear 57 at a speed proportional to the motor speed, thus continuously rotating shaft 60 clockwise (in respect to Fig. 8) and continuously lifting weight 140. Simultaneously, pallets 63 and 64 permit the escape wheel 62 and sun gear 57 through its engagement with planet pinion 56 to intermittently rotate shaft 60 counterclockwise, thus intermittently dropping weight 140 at each advance of the escape wheel. The effect is that weight 140 is continually being wound up by power derived from motor 1 and intermittently falling as it transmits this power to drive the pallets and pendulum. If the momentary motor speed is such that the continuous lift of the weight during one swing of the pendulum equals the drop as the escape wheel moves forward when released by one pallet and engaged by the other, there will be no net rotation of shaft 60 and associated parts, and the motor speed will be exactly the desired speed as determined by the chronometric mechanism. However, when the motor for any reason begins to depart from this desired speed, shaft 60 will gradually rotate clockwise (Fig. 8) if the motor runs too fast, or counterclockwise if it runs too slow.

These gradual plus or minus rotations of shaft 60 are used to correct the departures of motor 1 from the desired speed by actuating pilot valve 10 and thereby energizing servo-motor 7, by a mechanism now to be described.

The sleeve 142 has a lever arm 151 fixed thereto and connected by a pivot 152 to the upper end of a lever 153 which has its lower end connected by a link 154 to the stem 155 of the pilot valve 10. The lever 153 is pivoted intermediate its ends upon a pin 156 arranged in one bifurcated end of a link 157. When the sleeve 142 is rotated, the lever arm 151 swings the lever 153 upon the pin 156 and thereby causes it to shift the pilot valve plunger 11 to which the stem 155 is connected. The distance through which the lever arm 151 may move is limited by two stops 158 and 159 which are fixed to the side plate 40 and extend outward therefrom.

Link 157 has its other end bifurcated and provided with a pin 160 (Fig. 8) which is retained by a spring 161 in one of a plurality of notches 162 formed in a lever 163 intermediate the ends thereof. The lever 163 has its upper end urged forward or toward the link 157 by a spring 164 and its lower end fixed to one end of a shaft 165 which is journaled in two brackets 166 and 167 carried, respectively, by the side plates 40 and 41 upon the rear edges thereof.

The shaft 165 was fixed thereto and depending therefrom a lever 168 through which motion is transmitted to the lever 153 from the speed regulator which is adjusted when the lever 153 is moved by the differential mechanism described above. For example, motion may be transmitted from the slide block 4 of the variable displacement pump to the lever 168 through a rod 169 as shown in Fig. 1.

*Operation*

Assuming that the above described control unit is employed to control a hydraulic transmission as shown in Fig. 1, that the hydraulic motor 1 is driving the load 2 in a clockwise direction as indicated by the arrow, that the stroke of the variable displacement pump has been adjusted so that the hydraulic motor 1 is driving the shaft 3 at a speed which is proportional to the speed of the escape wheel 62, and that the electric motor 109 is idle so that the pendulum length remains unchanged, the motor 1 will rotate the differential case 24 at a speed proportional to the motor speed and in a clockwise direction as indicated by the arrow.

The speed of the motor 1 may tend to vary due either to a variation in the rate at which the variable displacement pump is driven or to a variation in the load which would cause a variation in the slip of the pump and motor. For example, if the load should increase and thereby cause an increase in slip with the resultant decrease in motor speed, the speed of the differential case 24 and the internal gear 55 fixed thereto would be decreased.

Decreasing the speed of the gear 55 would permit the constant speed sun gear 57 to move the planet pinion 56 in a counterclockwise direction and thereby swing the arm 59 and rotate the shaft 60 and the sleeve 142 in the same direction. The sleeve 142 would swing the lever arm 151 and the upper end of the lever 153 forward or toward the right as viewed in Fig. 1, and the lever 153 would pivot upon the pin 156 and shift the plunger 11 of the pilot valve 10 rearward or toward the left and permit the gear pump 9 to deliver liquid through the pipe 16, pilot valve 10 and pipe 8 to the servo-motor 7 to operate it.

The servo-motor 7 would shift the slide block 4 toward the left in respect to Fig. 1 to increase pump displacement and thereby increase the speed of the motor 1 until it was driving the shaft 3 at its initial speed.

As the slide block 4 moves toward the left, the rod 169 moves with it and permits the spring 164 to swing the levers 163 and 168 upon the axis of the shaft 165. The lever 163 shifts the link 157 toward the right, and the pin 156 in the end of the link 157 swings the lever 153 upon the pin 152 and moves the valve plunger 11 toward the right so that the valve plunger 11 is returned to its initial position as soon as the differential 20 ceases to transmit motion thereto, thereby stopping operation of the servo-motor 7 and maintaining the speed of the motor 1 at the desired speed.

If the speed of the motor 1 should increase, the speed of the differential case 24 would increase and the gear 55 would move the planet pinion 56 in a clockwise direction and thereby cause the above described linkage to be operated in the opposite direction and shift the pilot valve 11 toward the right in respect to Fig. 1.

Shifting the plunger 11 toward the right opens the pipe 8 to drain pipe 19 and permits liquid to escape from the head end of the servo-motor 7 thereby permitting the spring 5 to shift the slide block 4 toward the right to decrease pump displacement until the speed of the motor 1 has been decreased to the initial speed at which time the axis of the planet pinion 56 will become stationary.

As the slide block 4 moves toward the right, the rod 139 will swing the levers 168 and 163 upon the axis of the shaft 165 to cause the link 157 to swing the lever 163 toward the left to return the pilot valve plunger 11 to its neutral position as soon as the axis of the planet pinion 56 becomes stationary.

Theoretically, any variation in motor speed is corrected almost instantly and then the motor speed remains constant until varied momentarily by a variation in load or a variation in the rate at which liquid is delivered to the motor. It is now the actual practice, however, that due to friction and slight inaccuracies in the manufacture of the parts and to the fact that the escape wheel 62 rotates intermittently, the pilot valve plunger oscillates or vibrates through a very limited range and the speed of the motor 1 varies very slightly, for instance from 1 to 3 revolutions above and below the predetermined speed, but the average speed remains constant.

Since such slight variation is of no moment in actual practice, and since it could probably be overcome by precise manufacture and the use of anti-friction devices throughout the apparatus, it has been disregarded in the above explanation of the controller shown in Fig. 1 and it will be disregarded in the explanations given hereinafter.

If it is desired to vary the speed of the motor at a predetermined rate or according to a predetermined schedule, the electric motor 109 is energized to cause it to rotate the cam wheel 85 through the intervening mechanism previously described. The rate at which the motor speed is varied will depend upon the pitch and the rate of rotation of the cam wheel 85, and whether the motor speed is varied uniformly or non-uniformly will depend upon the contour of the cam wheel 85.

Assuming that the motor speed is to be uniformly increased during a given period of time, the cam wheel 85 will be rotated at a very slow constant speed in the direction of the arrow and its radii will increase uniformly in length from minimum to maximum in the direction of rotation as shown in Figs. 1, 4 and 5.

As the cam wheel 85 rotates, it will slowly force the lower end of the lever 82 rearward to cause the lever 82 to swing upon the shaft 83 and the segmental gear 81 to rotate the pinion 80 and the winding drum 75 at a slow rate. As the drum 75 rotates it will wind the ribbons 71 and 72 thereon and raise the pendulum bob 69 to gradually shorten the pendulum, the passage 70 permitting the bob 69 to slide upward on the rod 67.

Shortening the length of a pendulum increases the speed of the escape wheel controlled thereby as is well known. Therefore, as the pendulum bob 69 gradually rises, the speed of the escape wheel 62 gradually increases with the resultant increase in the speed of the sun gear 57 which causes the planet pinion 56 to move almost imperceptibly in the direction of rotation of the sun gear 57, thereby causing the speed of the motor 1 to be increased in the manner previously described and at a rate which is proportional to the rate at which the speed of the escape wheel 62 is increased. In addition to gradually increasing the motor speed, the controller will function in the manner previously described to compensate for any variations in load or power which would tend to affect the motor speed.

If continued or extensive adjustment of the pilot valve should cause the lever arm 151 to tend to swing in either direction beyond the range in which it can accurately adjust the pilot valve, the stop 158 or the stop 159 will prevent it from swinging beyond that range and then further travel of the planet pinion 56 will cause the pin 144 to ride out of the notch 145 in the end of the sleeve 142.

At the end of the period during which it is desired to increase the speed of the motor 1, the mechanism may be reset by simply depressing the front end of the release lever 99 as previously explained. If the operator fails to deenergize the electric motor 109 so that the pendulum bob 69 continues to rise until it stalls, no damage will result for the reason that the clutch 90—91 (Fig. 7) would slip and prevent further rotation of the shaft 90.

*Figs. 12 and 13*

The controller shown in Fig. 12 differs from the controller shown in Fig. 1 only in that certain features have been added and other features have been omitted. Consequently, like parts have been indicated by like reference numerals and no detailed description thereof will be given.

The change speed gears have been omitted to avoid complicating the view and as it is obvious that the change speed gears may be inserted at any convenient point between the hydraulic motor 1 and the differential 20 and at any convenient point between the electric motor 109 and the cam wheel 85. As shown, the motor shaft 3 is connected to the countershaft 22 by two gears 25a and 28a which are fixed, respectively on the shafts 3 and 22 and correspond to the gears 25 and 28 of Fig. 1, and the change speed gears 120 and 123 have been replaced by the pinion 106 and shaft 107 shown in Fig. 3.

In Fig. 1, the servo-motor 7 is shown connected directly to the slide block 4 of the variable displacement pump and any movement of the piston 6 causes an equal movement of the slide block. Due to the fact that the force required to overcome the friction and static inertia of the slide block is greater than the force required to keep the slide block moving after it has started to move, and to the fact that the slide block of the particular type of pump shown needs to move only a few thousandths of an inch to make a considerable variation in the speed of the motor, it sometimes happens that a variation in motor speed will, under certain conditions, cause the servo-motor to move the slide block so far that the pump overcompensates for variations in motor speed.

In order to avoid overcompensation, the controller shown in Fig. 12 is provided with a servo-motor capable of exerting a force greatly in excess of the force required to overcome the static inertia and friction of the slide block 4. As shown, a piston 201 is fitted in a cylinder 202 and provided with a stem 203 which has a flat guide face 204 formed thereon adjacent its lower end and in contact with a guide roller 205 carried by a stationary support 206 such as a part of the pump casing.

The stem 203 is provided at its lower end with a cam or wedge 207 having an inclined cam face 208 formed thereon to engage a roller 209 carried by the slide block 4. Downward movement of the piston 201 will cause the cam 207 to force the roller 209 away from the guide roller 205 and thereby move the slide block 4 toward the left to increase pump displacement against the resistance of two springs 5a which act directly upon the slide block and correspond to the spring 5 of the servo-motor 7 shown in Fig. 1.

Cam face 208 has a small angle with the cylinder axis so that piston 201 moves through a much greater distance than the resulting movement of slide block 4 thereby obtaining a precise location of slide block 4 and also preventing piston 201 from being affected by reactions from the slide block.

The cam 207 may be fixed to the stem 203 but, in order to provide means for preventing sudden changes in slip or leakage and hence in motor speed which would otherwise result from sudden changes of working pressure, cam 207 is shown connected to the stem by a pivot 210 and provided at its upper end with a cam face 211 which is engaged by a stem 212 carried by an expansible member or bellows 213 arranged inside the stem 203.

The bellows 213 is filled with a fluid which expands and contracts in response to variations in temperature and thereby causes the bellows to expand and contract. Expansion of the bellows in response to a rise in temperature advances the stem 212 which acts upon the cam face 211 and swings the upper end of the cam 207 toward the left and increases the angle of the cam face 208 so that the slide block will be shifted a greater distance in response to a given movement of the piston 201. Contraction of the bellows in response to a decrease in temperature has an opposite effect.

While certain parts of the apparatus have been shown separated from each other in schematic views for clearness in illustration, it is to be understood that in practice a single pump casing encloses both the power pump and the gear pump and provides a reservoir for the motive liquid according to the usual practice and as shown in Ferris Patent No. 1,854,127, and that cylinder 202 is fastened to or incorporated in the pump casing. The arrangement is such that the temperature of the liquid delivered by pump 9 to cylinder 202 will change as the temperature of the motive liquid changes and heat will be transmitted to bellows 213 from the motive liquid either directly by the liquid discharged from the motor contacting bellows 213 or indirectly by conduction through the metal, thereby causing bellows 213 to expand and contract in response to variations in the temperature of the motive liquid.

As will presently appear, servo-motor piston 201 is moved to change the location of the slide block responsively to movements of two separate pilot valves, one valve 11 being moved gradually by rotations of sleeve 142 as already described, and another pilot valve 230 (Fig. 13) being moved by changes in working pressure. The means provided for changing the effective angle of cam face 208 are important only in connection with the pressure responsive valve, and their function is to quickly make approximate adjustments of pump stroke responsively to sudden pressure changes without waiting until these changes have had time to introduce material errors in speed which can only be slowly corrected by the differentially operated pilot valve 11. This mechanism is the surge compensator described below.

The piston 201 is adapted to be urged downward by liquid supplied through a pipe 214 which has one of its ends connected to the upper end of the cylinder 202 and its other end connected to a surge compensator 215 to be presently described. The pipe 214 is connected intermediate its ends to one end of a pipe 216 which has its other end connected to the pilot valve 10 in communication with the port 18 thereof.

When the pilot valve plunger 11 is shifted toward the left, liquid will flow from the gear pump 9 through pipe 16, valve 10 and pipes 216 and 214 to the upper end of the cylinder 202 and force the piston 201 downward, thereby causing the cam face 208 to move over the roller 209 and force the slide block 4 toward the left to increase pump displacement with a resultant increase in the speed of the motor 1.

When the pilot valve plunger 11 is shifted toward the right, liquid may escape from the upper end of the cylinder 202 so that the piston 201 and the cam 207 may rise and the springs 5ª may move the slide block 4 toward the right to decrease pump displacement. The piston 201 may be moved upward by the action of springs 5ª, but the cylinder 202 ordinarily has a helical compression spring 217 arranged in the lower end thereof and urging the piston 201 upward to thereby relieve the springs 5ª of this burden.

The controller shown in Fig. 1 corrects variations in motor speed after the variations occur. In order to forestall variations in motor speed due to sudden variations in load, the controller shown in Fig. 12 is provided with the surge compensator 215 which adjusts pump displacement in response to variations in pump pressure to thereby prevent variations in pump pressure from having any material effect upon the speed of the motor.

The surge compensator 215 has a piston 220 (Fig. 13) fitted in a cylinder 221 to eject liquid therefrom into the pipe 214 which is connected to the lower end thereof. The piston 220 is normally held in the upper end of the cylinder 221 by liquid supplied by the gear pump 9 through the pilot valve 10 and the pipes 216 and 214, since liquid flowing through the pilot valve is throttled by the plunger 11, the pressure prevailing in the lower end of the clyinder 221 is considerably lower than gear pump pressure and is necessarily equal to the pressure in servo-motor cylinder 202.

Liquid for operating the piston 220 is supplied by the gear pump 9 through a pipe 222 which has one of its ends connected to the pipe 16 and its other end connected to the cylinder 221 intermediate the ends thereof. In order that ample liquid for instantly operating the piston 220 may always be available, an accumulator 223 may be connected by a pipe 224 to the pipe 222.

The piston 220 has an annular groove 225 formed in its periphery and communicating with pipe 222 in any position of the piston. The groove 225 communicates through a duct 226 with a bore 227 which is formed in the piston 220 upon the axis thereof and is closed at its lower end. Bore 227 communicates with the upper end of the cylinder 221 through a duct 228 which is formed in the piston and offset from the duct 226.

The duct 226 communicates at all times with an annular groove 229 formed in the periphery of a valve 230 which is fitted in the bore 227 and controls the flow of liquid to and from the upper end of the cylinder 221.

Valve 230 extends upward into a drain chamber 231 which is arranged upon the upper end of the cylinder 221 and connected by a pipe 232 to the drain pipe 19. A stem 233 is fixed to the upper end of the valve 230 and forms therewith a shoulder 234 which is adapted to abut the upper wall 235 of the drain chamber 231 and thereby limit the upward movement of the valve.

The shoulder 234 is normally held in contact with the wall 235 by a helical compression spring 236 which encircles the stem 233 and has one of its ends in contact with the wall 235 and its other end in contact with a collar 237 fixed on the stem 233 in adjusted position.

When the piston 220 and the valve 230 are in their uppermost positions, the upper edge of the duct 228 is substantially in alignment with the lower edge of the groove 229 and the lower edge of the duct 228 is substantially in alignment with the upper edge of a duct 238 which is formed in the valve 230 radially thereof. The duct 238 communicates with a duct 239 which extends upward through the valve 230 from the lower end thereof and communicates with the drain chamber 231 through one or more radial ducts 240 formed in the valve.

The arrangement is such that a downward movement of valve 230 opens duct 228 to groove 229 and permits liquid from the gear pump 9 to flow through pipes 16 and 222, groove 225, duct 226, groove 229 and duct 228 to the upper end of cylinder 221. The upper end of piston 220 will thus be exposed to gear pump pressure and, since the pressure in the lower end of cylinder 221 is lower than gear pump pressure due to the throttling action of pilot valve 10, the liquid entering the upper end of cylinder 221 will force piston 220 downward and cause it to eject liquid from the lower end of cylinder 221 until piston 220 has moved downward exactly the same distance that valve 230 moved downward at which time duct 228 has moved out of registry with groove 229 and downward movement of piston 220 will cease.

Thereafter, a further downward movement of valve 230 through any given distance will result in a further downward movement of piston 220 through exactly the same distance, as explained above. An upward movement of valve 230 will open duct 228 to duct 238 and permit the pressure prevailing in the lower end of cylinder 221 to raise piston 220 and cause it to eject liquid from the upper end of cylinder 221 through ducts 228, 238, 239 and 240, chamber 231 and pipes 232 and 19 into the reservoir 15 until piston 220 has been raised exactly the same distance that valve 230 was raised at which time duct 228 will have moved out of registry with duct 238 so that no more liquid can escape from the upper end of cylinder 221.

If valve 230 has been raised to its uppermost position so that shoulder 234 contacts wall 235, piston 220 will stall against the upper end of cylinder 221. If valve 230 has been raised to a point short of its uppermost position, liquid will be trapped in the upper end of cylinder 221 when duct 228 moves out of registry with duct 238 and this entrapped liquid will prevent any further upward movement of piston 220.

Valve 230 is adapted to be moved downward in response to the pressure of the motive liquid increasing above the pressure determined by the resistance of spring 236. As shown, a small diameter piston 241 is fixed to the upper end of valve stem 233 and fitted in a cylinder 242 which is rigidly secured to cylinder 221 as by means of a casing 243 in which the spring 236 is arranged.

The upper end of cylinder 242 is connected by a pipe 244 to the pipe 245 through which the variable displacement pump delivers liquid to the motor 1 to drive it. Piston 241 is thus exposed at all times to pump pressure and will at all times move either downward or upward as the working pressure on piston 241 increases or decreases the deflection of spring 236. An increase in pump pressure due to an increase in motor load or other cause will force piston 241 and valve 230 downward a distance substantially proportional to the increase in pressure and permit gear pump liquid to enter the upper end of cylinder 221 and force piston 220 downward exactly the same distance that valve 230 moved downward as previously explained. Piston 220 will eject liquid from the lower end of cylinder 221 through pipe 214 into the upper end of cylinder 202 and thereby force downward piston 201 which will operate cam 207 to shift slide block 4 toward the left to increase pump displacement with a resultant increase in pump delivery.

It is thus apparent that servo-motor piston 201 is moved to any given position corresponding to a desired speed of motor 1 by liquid received directly from the gear pump through pilot valve 10 and pipe 216, or by liquid transferred from surge compensator cylinder 221, or by a combined action of the two. If the speed change be accompanied by a pressure change, the surge compensator will act together with the differential to make the required stroke adjustment. But the part played by the surge compensator is of no importance except when the pressure change is so rapid as to change the slip of the system too fast for the differential to follow promptly. In such conditions the surge compensator makes an approximate stroke correction instantly, leaving to the slower differential only the task of precise adjustment.

A given change in pressure will make a greater or less change in slip as the oil is hot or cold. But the resulting movement of piston 220 is only proportional to the pressure change. The function of the bellows 213 and co-acting parts is to increase the effective angle of wedge face 208 as the oil grows hotter, so that the resulting stroke adjustments may be increased with the increase in slip.

It is to be understood that the several parts of the surge compensator are so proportioned in respect to cylinder 202 that the volume of liquid ejected from cylinder 221 into cylinder 202 in response to a given increase in pump pressure will be just enough to shift slide block 4 the correct distance to increase pump delivery by an amount equal to the increase in slip due to that increase in pressure.

A decrease in pump pressure due to a decrease in motor load or other cause will have the opposite effect. That is, a given decrease in pump pressure will permit spring 236 to raise valve 230 a given distance and permit spring 217 to raise piston 201 which will eject liquid from cylinder 202 through pipe 214 into cylinder 221 until this liquid has raised piston 220 the same distance valve 230 was raised. Raising piston 201 will permit the springs 5ª to shift slide block 4 toward the right to decrease pump displacement by an amount equal to the decrease in slip due to the decrease in pressure.

The surge compensator thus functions to prevent variations in motor speed due to sudden or wide variations in motor load with the resultant variation in pump pressure. Any variation in motor speed is corrected by delivery of liquid from gear pump 9 to cylinder 202 or by permitting liquid to escape from cylinder 202 under the control of pilot valve 10 which is operated in response to any movement imparted to the output leg of differential 20 by the motor speed deviating from the desired speed as previously explained in connection with the description of the controller shown schematically in Fig. 1. The two parts of the controller thus function to maintain the speed of motor 1 proportional to a standard or measuring speed.

When plunger 11 of pilot valve 10 is shifted by the output leg of differential 20 from its central or neutral position to effect movement of slide block 4, it must be imediately returned to its central or neutral position by movement of slide block 4 transmitted through the follow up mechanism as previously explained. Therefore, it is necessary to provide means for preventing adjustment of the follow up mechanism from being affected when slide block 4 is shifted by the surge compensator.

As shown, the rod 169, which transmits motion from slide block 4 to lever 168 in the controller shown in Fig. 1, is divided into two parts 169ª and 169ᵇ and a wedge 246 is interposed between the two parts. The wedge 246 is fastened to the lower end of a stem 247 which is pivoted at its upper end to the outer end of an arm 248 the other end of which is fastened to stem 233 in adjusted position.

When valve 230 moves downward and thereby causes slide block 4 to move toward the left as previously explained, the movement of slide block 4 is simultaneous with the movement of valve 230 for the reason that there is a solid column of liquid between pistons 202 and 220. Slide block 4 moves rod section 169ª with it and valve stem 233 moves wedge 246 downward to compensate for movement of rod section 169ª. That is, wedge 246 remains in contact with both of the rod sections 169ª and 169ᵇ in any position of valve 230 so that any movement of slide block 4 caused by adjustment of pilot valve 10 will be transmitted back to pilot valve 10 from slide block 4 through rod sections 169ª and 169ᵇ, wedge 246 and the follow up mechanism.

When valve 230 moves upward and thereby causes slide block 4 to move toward the right as previously explained, wedge 246 will move upward with valve 230 and thereby compensate for the movement of slide block 4 caused by upward movement of valve 230. In other words, wedge 246 prevents the lower end of lever 168 from being displaced by the surge compensator shifting slide block 4.

*Figs. 14 to 18*

The speed controller is shown in Fig. 14 as being employed to control the speed of an electric motor 301 which is adapted to have its speed varied by adjusting a rheostat 302 having a conact arm 303 which may be swung in one direction or the other from an intermediate position to increase or decrease motor speed.

The contact arm 303 is adapted to be operated by a hydraulic servo-motor consisting of a cylinder 304, a piston 305 fitted in cylinder 304 and provided with a stem 306 which is connected to the arm 303 by linkage 307, and a helical compression spring 308 arranged in the lower end of cylinder 304 and urging piston 305 upward.

The servo-motor operates the rheostat 302 to make corrections for variations in motor speed and to compensate for wide or sudden variations in motor load to thereby prevent such variations in load from having any material effects upon motor speed.

The mechanism for controlling the servo-motor to cause it to make corrections for variations in motor speed is the same as the corresponding mechanism illustrated in Fig. 12 and previously described. Consequently, like parts have been indicated by like reference numerals and no detailed description thereof will be given. It is deemed sufficient to state that the liquid for operating the servo-motor for this purpose is supplied to the upper end of cylinder 304 through pipes 214 and 216 from gear pump 9 under the control of pilot valve 10, and that the differential case 24 is rotated through the previously described drive from a shaft 309 which is an extension of or is caused to rotate with the shaft of motor 301.

Also, this mechanism operates in exactly the same manner as the mechanism shown in Fig. 12, the only difference being that it operates a rheostat to vary the flow of electric energy to an electric motor instead of adjusting a pump to vary the flow of hydraulic energy to a hydraulic motor.

The mechanism which compensates for sudden or wide variations in load is provided with a surge compensator 315 which is similar to the surge compensator 215 shown in Fig. 12 except that it is actuated mechanically instead of being actuated hydraulically.

A variation in the load on the hydraulic motor shown in Fig. 12 causes a variation in pump pressure which is utilized to operate surge compensator 215. A variation in the load on the electric motor 301 causes a variation in torque. In order to utilize this variation in torque for operating the surge compensator 315, a torque coupling 320 is interposed between the shaft 321 of motor 301 and a shaft 322 through which the load is driven.

As shown in Figs. 16 to 18, the torque coupling 20 is provided with a driving member or casing 23 which has a hub 324 of substantial thickness fixed to shaft 321. The casing 323 encloses a circular driven member or flange 325 the hub 326 of which is journaled upon shaft 321 and connected by a coupling 327 to shaft 322.

The flange 325 is connected to casing 323 by one or more springs 328 each of which has one of its ends fastened to a post 329 fixed to casing 23 and its other end fastened to a post 330 fixed to flange 325. When shaft 321 is rotated by motor 301, casing 323 will rotate flange 325 through springs 328, and flange 325 will rotate shaft 322 through joint 327. Flange 325 will rotate in synchronism with casing 323 until a change occurs in the torque being transmitted and then springs 28 will be shortened or lengthened depending upon whether the torque increases or decreases. In either case casing 323 will rotate through a limited angular distance relative to flange 325.

If the load should change rapidly, flange 325 might oscillate rapidly or vibrate relative to casing 323. This tendency toward oscillation may be prevented or reduced by providing one or more dashpots between the driving and driven members. As shown, a dashpot has its cylinder 331 pivoted upon a pin 332 fixed to casing 323 and its piston 333 pivoted upon a pin 334 fixed to flange 325.

In order to utilize the above mentioned relative rotation, screws 335 are threaded through hub 324 and each screw has its inner end provided with a pinion 336 and its outer end rotatably connected to a collar 337 which is journaled upon shaft 321. The arrangement is such that rotation of screws 335 will move collar 337 along shaft 321.

The pinions 336 mesh with a gear 338 formed on a sleeve 339 which is journaled on shaft 321 and provided with a lever arm 340 at the inner end thereof. The arm 340 is connected by a link 341 to one arm of a bell crank lever 342 which is pivoted at the junction of its arms upon a pin 343 carried by a bracket 344 fixed to the side wall of casing 323. The other arm of bell crank lever 342 has a circular head 345 formed thereon and arranged between two lugs 346 and 347 which are fixed to flange 325.

When the load on shaft 322 increases or decreases so as to cause a change in the tension of springs 328, casing 323 will rotate through a limited angular distance relative to flange 325, lug 346 or 347 will act upon head 345 and rock bell crank lever 342 on pin 343 in one direction or the other depending upon the direction of rotation of shaft 321.

Rocking bell crank lever 342 will cause link 341 to rotate sleeve 339 and gear 338 and thereby cause pinions 336 to rotate. Rotation of pinions 336 will cause screws 335 to travel through hub 324 and move collar 337 along shaft 321. The arrangement is such that an increase in load will cause collar 337 to move along shaft 321 away from hub 324. A decrease in load will move collar 337 toward hub 324.

Collar 337 engages one arm of a bell crank lever 350 which is pivoted at the junction of its arms upon a stationary pin 351 and has its horizontal arm connected to the upper end of a stem 352 by means of which operation of surge compensator 315 is effected.

Surge compensator 315 differs from surge compensator 215 only in that collar 237, piston 241, cylinder 242 and casing 243 are omitted. Stem 233 is replaced by stem 352 which has arm 248 fastened thereon, and spring 236 is replaced by a weaker spring 353 which is arranged in the lower end of bore 227 to support valve 230 and take up backlash in the link and lever connections from valve 230 to torque coupling 320.

The remaining parts and channels are exactly the same as in surge compensator 215 and the pipes which connect surge compensator 315 to the servo-motor, gear pump and pilot valve are the same as the corresponding pipes shown in Fig. 12. Consequently, like parts and channels have been indicated by like reference numerals and no detailed description thereof will be given.

*Operation*

An increase in the load on motor 301 would cause motor 301 to slow down if it were connected to the load by an inflexible drive. However, springs 328 in torque coupling 320 will yield under the increased load and thereby prevent the increase in load from instantly decelerating motor 301.

As the springs 328 yield, flange 325 will lag behind casing 323 and thereby cause screws 335 to move collar 337 which will operate bell crank lever 350 to depress stem 352 and valve 230 a distance substantially proportional to the increase in load.

Depressing the valve 230 will open duct 228 to groove 229 and permit liquid from gear pump 9 to flow through pipes 16 and 222, groove 225, duct 226, groove 229 and duct 228 to the upper end of the cylinder 221. The upper end of piston 220 will thus be exposed to gear pump pressure and, since the pressure in the lower end of cylinder 221 is lower than gear pump pressure due to the throttling action of pilot valve 10, the liquid entering the upper end of cylinder 221 will force piston 220 downward and cause it to eject liquid from the lower end of cylinder 221 until piston 220 has moved downward exactly the same distance that valve 230 moved downward at which time duct 228 has moved out of registry with groove 229 and downward movement of piston 220 will cease.

The liquid ejected from the lower end of cylinder 221 will flow through pipe 214 to cylinder 304 and depress piston 305 which will swing contact arm 303 to increase the flow of energy to motor 301 by an amount substantially sufficient to prevent motor 301 from slowing down under the increased load.

A decrease in motor load will have the opposite effect. That is, a given decrease in load will permit springs 328 to expand and rotate flange 325 relative to casing 323 so that screws 335 are actuated to move collar 337 toward hub 324, thereby permitting spring 353 to raise valve 230 by an amount substantially proportional to the decrease in load.

Raising valve 230 opens duct 228 to duct 238 and permits spring 308 to raise piston 305 which will expel liquid from cylinder 304 through pipe 214 to the lower end of cylinder 221. This liquid will raise piston 220 and cause it to expel liquid from the upper end of cylinder 221 through ducts 228, 238, 239 and 240, chamber 231 and pipes 232 and 19 into reservoir 15 until duct 228 has moved out of registry with duct 238 at which time upward movement of piston 220 ceases and prevents piston 305 from moving farther upward.

The piston 305 is thus raised a distance substantially proportional to the decrease in motor load and, in rising, it swings contact arm 303 to decrease the flow of energy to motor 301 by an amount substantially proportional to the decrease in load, thereby preventing motor 301 from accelerating under the lighter load.

The surge compensator thus tends to prevent any variation in motor speed due to variation in motor load, and it prevents any material variation in motor speed due to a sudden or wide variation in motor load.

Any variation in motor speed is corrected by the servo-motor operating rheostat 302 under the control of pilot valve 10 in the manner previously explained in connection with the operation of the controller shown in Fig. 12.

When pilot valve plunger 11 is moved from its central or neutral position to effect operation of the servo-motor to thereby correct a variation in motor speed, it must be immediately returned to that position by motion imparted to it by the servo-motor through the follow up mechanism as previously explained.

In order to accomplish this result, the rod section 169ª is connected to contact arm 303 and wedge 246 is interposed between sections 169ª and 169ᵇ so that motion is transmitted from contact arm 303 to the follow up mechanism in the same manner that motion is transmitted from slide block 4 to the follow up mechanism of the controller shown in Fig. 12.

*Figs. 19 to 25*

The controllers shown in Figs. 19 and 20 are the same, respectively, as the controllers shown in Figs. 12 and 14 except that a different type of chronometric mechanism is employed to produce the standard or measuring speed to which the speed of the prime mover is compared by the differential 20. Consequently, those parts of the controller which are identical with the corresponding parts of the previously described controllers have been indicated by identical reference numerals and no detailed description thereof will be given.

The chronometric mechanism shown in Figs. 19 to 25 consists primarily of a synchronous electric motor or other source of constant speed and a variable speed friction disk transmission, together with means for adjusting the disk transmission to vary the ratio between the speed of its input shaft and the speed of its output shaft. The friction disk transmission is adapted to replace, in the control unit shown in Figs. 2 to 11, the escapement and means for varying the length of the pendulum.

As shown in Figs. 21 and 22, the friction disk transmission is supported in part by the side plate 41 of the control unit and in part by a sub-frame consisting of a vertical plate 401 and two horizontal tubular posts 402 and 403 which are fixed, respectively, to the lower front corner and the upper rear corner of plate 401.

The sub-frame is attached to the side plate 41 of the control unit by removing the bolts 42 from the lower front and upper rear corners of side plates 41 and 42 and replacing them with long bolts 404 which extend through the posts 402 and 403 and fasten the sub-frame securely to side plate 41. The sub-frame may be accurately located and additionally supported by suitable dowel pins fixed in side plate 41 and extending through flanges formed on the end of posts 402 and 403 as shown.

Instead of the escape wheel 62, the shaft 61 of differential 20 has a gear 405 fixed upon its outer end. Gear 405 meshes with a gear 406 fixed upon the outer end of a shaft 407 which is journaled in a bearing assembly 408 carried by side plate 41. Bearing assembly 408 is adapted to take the thrust of a friction disk 409 which rotates in a vertical plane and is fixed for rotation with gear 406.

Rotation is imparted to disk 409 through a horizontal disk 410 from a disk 411 which is opposed to disk 409 and arranged concentric with a gear 412. Disk 411 and gear 412 are both fixed at the centers thereof to one end of a shaft 413 which is offset from the axis of rotation of disk 409 and journaled in a bearing assembly 414 carried by plate 401.

Bearing assembly 414 is so constructed that a spring 415 thereof urges shaft 413 toward the left in respect to Fig. 21 and thereby causes disk 411 to press disk 410 against disk 409 so that, when disk 411 is rotated, disk 410 will be rotated and cause rotation of disk 409.

Gear 412 meshes with a pinion 416 (Fig. 25)

fixed upon the inner end of a shaft 417 which is journaled in bearings carried by plate 401. Shaft 417 has a gear 418 fixed upon its outer end and in mesh with a gear 419 which is journaled upon a shaft 420 carried by plate 401.

Gear 419 meshes with a pinion 421 which is fixed to a gear 422 journaled therewith upon a shaft 423 carried by plate 401. Gear 422 meshes with a pinion 424 fixed on a shaft 425 which is journaled in bearings carried by a tube 426 fixed in plate 401. Shaft 425 is connected by a coupling 427 to a synchronous electric motor 428 such as an electric clock motor.

Motor 428, when energized, will rotate disk 411 through the above mentioned gear train at a speed which is proportional to the lapse of time and which is relatively slow, for instance, 3 R. P. M. Rotation of disk 411 will cause disk 410 to rotate disk 409 at a speed determined by the position of disk 410 relative to the axes of disks 409 and 411, the speed of disk 409 increases as disk 410 is moved farther from the axis of disk 411 and nearer the axis of disk 409, or upward in respect to Fig. 21.

Disk 410 is fixed upon a shaft 440 having each of its ends journaled in an anti-friction thrust bearing arranged in a carriage 441. The bearings for shaft 440 are closely fitted in suitable bores formed in the upper and lower arms of carriage 441. The upper bearing is restrained from upward movement by a cap 442 fastened to the top of the upper arm. The lower bearing is supported by a cylindrical block 443 which is slidable in the lower bore and urged upward to prevent end play of shaft 440 as will be presently explained.

Carriage 441 is fitted upon a column 444 to slide thereon. Column 444 is fixed at its upper and lower ends, respectively, in two arms or supports 445 and 446 which are fixed to or formed integral with plate 401 and extend inward therefrom or toward the left in respect to Fig. 21.

Carriage 441 is adapted to be raised and lowered, to raise and lower disk 410 to thereby vary the speed of disk 409, by rotation of cam wheel 85 which is fastened to gear 88 to rotate therewith as explained in the description of the control unit shown in Figs. 2 to 11.

Cam wheel 85 is engaged upon its periphery by a roller 450 arranged at the lower end of a lever 451 which is fixed to a shaft 452 journaled in side plate 41 and in plate 401. Roller 450 is urged into firm engagement with the periphery of cam wheel 85 by a spring 453 which has one of its ends attached to a flange of plate 401 and its other end attached to a short lever 454 fixed upon shaft 452 at the outer end thereof.

Lever 451 has an arm 455 fixed thereto or formed integral therewith and extending forward or toward the left in respect to Fig. 22 and inward or toward the left in respect to Fig. 23. Shaft 452 has a lever arm 456 journaled thereon directly above arm 455 and extending forward over the upper end of carriage 441.

The free end of arm 455 is spaced from lever arm 456 by a helical compression spring 457, and it is connected to lever arm 456 by a bolt 458 which is fastened at its lower end to arm 455, extends upward through spring 457 and through lever 456 and is provided at its upper end with nuts 459 by means of which the position of the outer end of lever arm 456 may be adjusted.

Lever arm 456 is connected by a pair of links 460 to the rear end of a support arm 461 which extends forward under carriage 441 and has its free end urged upward by a spring 462 having one of its ends connected to lever arm 456 and its other end connected to arm 461 intermediate the ends thereof.

Carriage 441 is confined between arms 456 and 461 by two pins 463 and 464 which have the ends thereof rounded or pointed. This arrangement permits the left hand end of arm 456 to move in its arcuate path without cramping the free movement of carriage 441, on column 444.

Pin 463 has one of its ends bearing in a socket formed in the top of cap 442 and its other end bearing in a socket formed in the under side of arm 456. Pin 464 has one of its ends bearing in a socket formed in the top of arm 461 and its other end bearing in a socket formed in the under side of block 443. Carriage 441 is thus supported upon pin 464, and spring 462 urges block 443 upward to prevent any end play of shaft 440.

*Operation*

Assuming that the case 24 of differential 20 is being rotated by a prime mover and that synchronous motor 428 is energized, the controller will operate as follows:

Motor 428 will rotate disk 409 through the above described train of gears and disks 411 and 410. The speed at which disk 409 is rotated will depend upon the ratios of the gears comprising the train and upon the position of disk 410 relative to the axes of disks 409 and 411 but it will be a standard or measuring speed which in this case will be proportional to the lapse of time for the reason that the speed of motor 428 is time controlled.

If the speed of the prime mover should vary from a speed which is exactly proportional to the standard or measuring speed, the variation would cause the output shaft 60 of differential 20 to rotate and effect an adjustment of the pump, in the case of the controller shown in Fig. 19, or an adjustment of the rheostat in the case of the controller shown in Fig. 20. In either case, the speed of the prime mover would be corrected to correspond to the standard or measuring speed as previously explained.

If it were desired to vary the speed of the prime mover, cam wheel 85 would be rotated in one direction or the other to increase or decrease the prime mover speed. If cam wheel 85 were rotated in the direction of the arrow in Fig. 22, it would swing the lower end of lever 451 rearward or toward the right to rotate shaft 452 and cause arm 455, acting through bolt 458, to swing arm 456 downward and thereby lower disk 410 to decrease the speed of disk 409 with a resultant decrease in the speed of shaft 61. Decreasing the speed of shaft 61 would cause a decrease in prime mover speed as previously explained. If cam wheel 85 were rotated in the opposite direction, disk 410 would be raised and the speed of the prime mover would be increased.

If it were desired to vary the prime mover speed during a given period of time, cam wheel 85 would be driven at a uniform speed as by means of the constant speed electric motor 109 and the reduction gears shown schematictally in Fig. 19 and previously described in connection with the description of the controllers shown in Figs. 1 to 12. Also, the prime mover speed would be varied uniformly or non-uniformly depending upon the contour of cam wheel 85.

If it were desired to vary the prime mover speed rapidly and at the will of the operator, cam wheel 65 could be driven at a higher speed as by meshing gear 88 with the pinion 470 of an electric motor 471 which could be of the reversible type and controlled by a manually operable switch 472 as shown schematically in Fig. 20. The prime mover could then be rapidly accelerated or decelerated by depressing one or the other of the buttons on switch 472.

The friction disk transmission is not capable of transmitting very much power without slipping but it is capable of accurately transmitting considerably more than the very small amount of power required to operate pilot valve 10. For the purpose of illustration, the pilot valve has been shown on a large scale, but, regardless of whether the controller is provided with a clock escapement or with a friction disk transmission driven by a synchronous motor, the pilot valve used in practice is very small and its valve member or plunger has never exceeded 3/8" diameter so that the force required to shift the plunger is negligible.

*Fig. 26*

The controller shown in this figure differs from the previously described controllers in that the speed measuring leg of the differential is driven by motion imparted thereto from an exterior body which is moved or actuated independently of either the controller or the prime mover controlled thereby.

Otherwise the controller is the same as the previously described controllers. In order to simplify the view, a part of the control unit mechanism has been concealed in a casing 500 and the pump is shown provided with a simple servo-motor. The parts shown which are like the corresponding parts of the previously described controllers have been indicated by like reference numerals and no detailed description thereof will be given.

As shown, the hydraulic motor 1 has its shaft 3 connected to a rotary paper cutter 501 which is employed to cut a strip of paper 502 into sheets 503 of a predetermined length. The controller has its control unit connected to shaft 3 by a chain and sprocket drive 504, and it controls the speed of motor 1 by controlling the flow of liquid to a servo-motor 505 which adjusts pump displacement.

Motor 1 must rotate cutter 501 at a speed which remains absolutely proportional to the speed at which strip 502 is fed thereto in order that each sheet may be of exactly the same length as the preceding sheet.

The strip of paper 502 is supplied by a paper making or other machine of which only the delivery rolls 506 and 507 are shown. Rolls 506 and 507 direct strip 502 between two feed rolls 508 and 509 which feed it across a cutting table 510 and under the cutter 501. Strip 502 moves continuously and has a sheet 503 cut from its leading end by cutter 501 during each revolution thereof. As each sheet is severed from the strip, it falls upon a conveyor 511 which carries it away from the cutter.

The delivery and feed rolls are driven continuously at a substantially constant speed by a power source independent of motor 1. If cutter 501 rotated at a constant speed and strip 502 should be fed thereto at a constant rate, all of the sheets 503 would be the same length. However, the speed of the rolls will vary due to variations in load on the machine and there may be some slippage between the strip and rolls 506 and 507 due to shrinkage of the paper. Furthermore, the speed of the paper web is frequently adjustable through a wide range.

Therefore, the speed of motor 1 must be continuously adjusted to keep the speed of cutter 501 absolutely proportional to the rate at which strip 502 is fed thereto. This is accomplished by driving the speed measuring leg of the differential at a speed exactly proportional to the speed at which strip 502 passes under cutter 501.

As shown, shaft 61 of the differential has a gear 512 fixed to its outer end instead of either the scape wheel 62 of the controller shown in Figs. 1 to 14 or the disk 409 of the controllers shown in Figs. 19 to 25. Gear 512 meshes with a pinion 513 which is fixed upon one end of a shaft 514 having a measuring roller 515 fixed upon the other end thereof.

Roller 515 may engage strip 502 above table 510 but it is shown arranged immediately ahead of roller 509 and pressing strip 502 against a block 516 so that any slack in the strip between the delivery and the feed rolls will not cause any slippage between strip 502 and the roller 515.

As strip 502 is drawn through rollers 509 and 508, it will rotate roller 515 at a peripheral speed exactly equal to the linear speed of strip 502. Roller 515 will rotate shaft 61 through shaft 514 and gears 512 and 513 so that the measuring leg of the differential is rotated at a speed exactly proportional to the speed of the strip, thereby enabling the controller, in the manner previously explained, to maintain the speed of motor 1 exactly proportional to the speed of strip 502.

Figure 27:
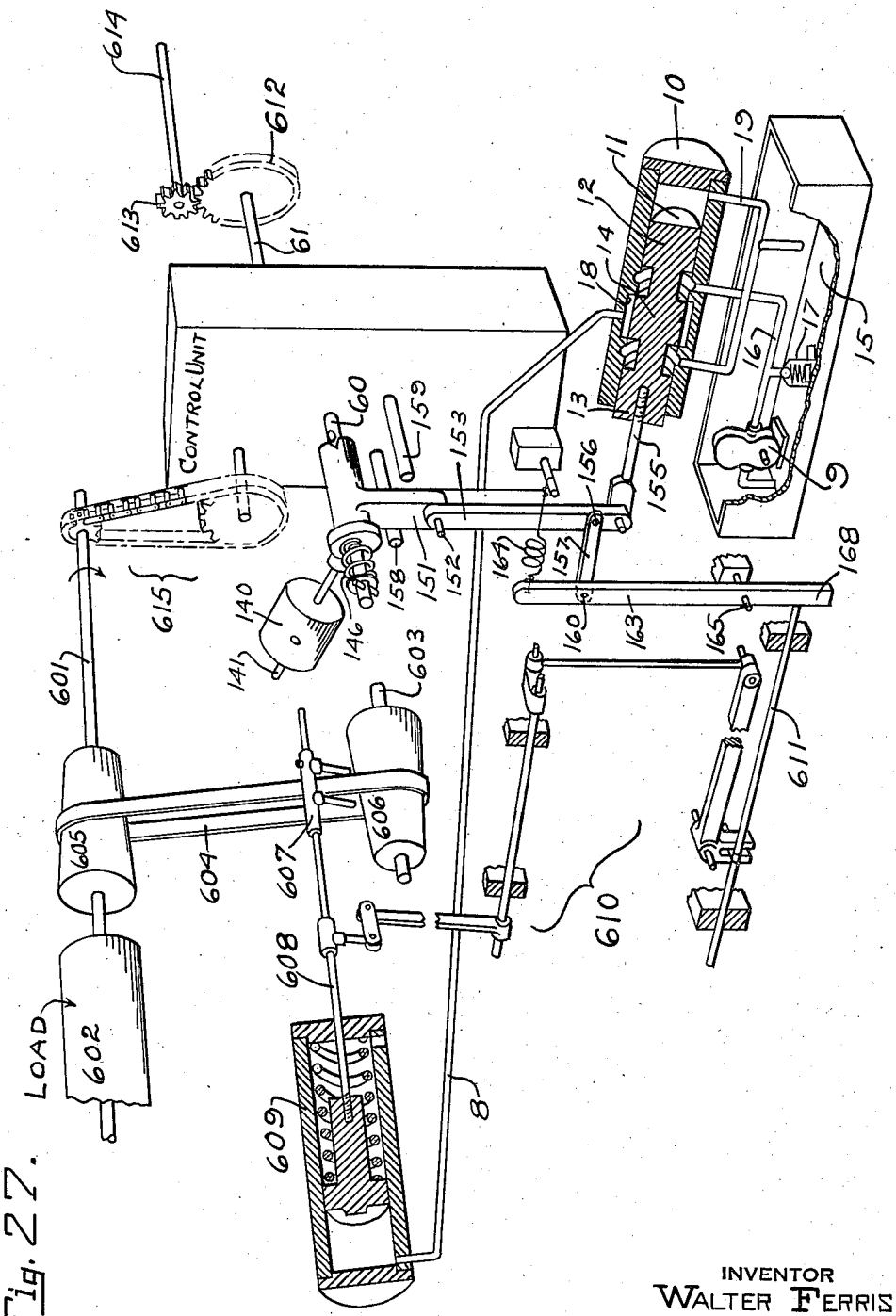
Fig. 27 is a view schematically showing the invention employed to control the speed of a mechanical prime mover, such as a driving shaft which is driven by a driven shaft or other power source through a belt and cone pulley transmission or any other stepless variable speed transmission.

*Fig. 27*

This figure shows the controller employed to control the speed of a mechanical prime mover such as a driving shaft 601 which drives the load 602 and receives its energy from a power source such as a driven shaft 603. As shown, shaft 601 is driven from shaft 603 by a drive consisting of a belt 604 and two cone pulleys 605 and 606 fixed, respectively, on shaft 601 and shaft 603. The speed of shaft 601 may be varied by moving belt 604 along pulleys 605 and 606 by means of a belt shifter 607 which is connected by a rod 608 to a hydraulic servo-motor 609 and is adapted to be operated thereby.

Servo-motor 609 is operated in one direction or the other by either directing liquid thereto from gear pump 9 or by permitting liquid to escape therefrom under the control of pilot valve 10. As previously explained, the plunger 11 of pilot valve 10 is shifted to an operative position by movement of arm 151 of the control unit and must be immediately thereafter returned to its inoperative position by motion transmitted to it by the servo-motor through the follow up mechanism.

As shown, motion is transmitted from servo-motor 609 to the follow up mechanism through a linkage 610 and a rod 611 which has one end thereof in engagement with a lever 168 of the follow up mechanism. Linkage 610, which has one of its ends connected to rod 608 and its other end connected to rod 611, is so constructed that movement of rod 608 in one direction or the other will result in movement of rod 611 in one direction or the other.

The arrangement is such that, when pilot valve plunger 11 is shifted toward the left by movement of arm 151, liquid from gear pump 9 will flow through pipe 8 to servo-motor 609 and cause it to move shifter 607 toward the right, thereby shifting belt 604 along pulleys 605 and 606 to increase the speed of shaft 601.

As shifter 607 moves toward the right, linkage 610 will move rod 611 toward the left and permit spring 164 to swing levers 163 and 168 upon the axis of shaft 165 and thereby cause pilot valve plunger 11 to be returned to its initial or inoperative position the instant that movement of arm 151 ceases.

When pilot valve plunger is shifted toward the right, liquid may escape from servo-motor 609 and the above described operation will be reversed. That is, belt 604 will be moved toward the left to decrease the speed of shaft 601 and pilot valve plunger 11 will be returned to its inoperative position the instant that movement of arm 151 ceases.

The controller may be employed to maintain the speed of the prime mover constant or to vary it during a given period of time, or it may be employed to maintain the speed of the prime mover proportional to the speed of an independently driven machine or to the speed of a moving body such as the strip of paper 502 shown in Fig. 26.

In the first case, the speed measuring leg of the differential would be connected to the clock escapement shown in Figs. 1 to 11 or to the synchronous motor operated friction disk transmission shown in Figs. 19 to 25. In the second case, the speed measuring leg of the differential would be driven by motion imparted thereto from the machine or moving body. In either case, the other input leg of the differential would be driven by the prime mover.

As shown, the speed measuring shaft 61 of the differential is connected through reduction gears 612 and 613 to a shaft 614 which, for example, may have the measuring roller 515 fixed thereon to engage the strip of paper 502 as shown in Fig. 26, and the other input leg of the differential is connected by a drive 615 to shaft 601 to be driven thereby.

If the speed of prime mover 601 should vary from the speed which is exactly proportional to the speed of shaft 614, the variation in prime mover speed would cause the shaft 60 to swing arm 151 which would operate pilot valve 10 to effect correction of prime mover speed in the above described manner.

When the apparatus is in operation, the speed of shaft 603 may vary due to variations in load, slippage of belts or other causes, and the speed of shaft 614 may vary to variations in the speed of the machine or moving body from which it is actuated, but the controller will nevertheless function in the manner explained to maintain the speed of shaft 601 proportional to the speed of shaft 614 within the limit of the controller.

The invention herein set forth is susceptible of various other modifications and adaptations without departing from the scope thereof.

The invention is hereby claimed as follows:

1. The combination, with a power source, a prime mover energized by power supplied thereto from said source and a regulator for varying the speed of said prime mover, of a differential having one leg thereof driven by said prime mover at a speed proportional to the actual speed of said prime mover, means for driving the second leg of said differential at a speed proportional to the desired speed of said prime mover whereby the output leg of said differential reflects the difference between the actual and the desired speeds of said prime mover, means including a servo-motor for operating said regulator, means for supplying energy to said servo-motor, a sensitive controller for controlling the operation of said servo-motor, means for operating said controller in response to movements of the output leg of said differential to thereby cause said regulator to maintain the speed of said prime mover proportional to the speed of the second leg of said differential, means for varying the speed of the second leg of said differential according to a predetermined schedule to thereby cause the speed of said prime mover to be varied according to said schedule.

2. The combination, with a power source, a prime mover energized by power supplied thereto from said source and a regulator for varying the speed of said prime mover, of a differential having one leg thereof driven by said prime mover at a speed proportional to the actual speed of said prime mover, means for driving the second leg of said differential at a constant speed which is proportional to the desired speed of said prime mover whereby the output leg of said differential reflects the difference between the actual and the desired speeds of said prime mover, means including a fluid motor for operating said regulator, means for supplying motive fluid to said motor, a pilot valve operated in response to movements of the output leg of said differential for controlling the flow of motive fluid to and from said motor to effect operation of said regulator and thereby maintain the speed of said prime mover proportional to the speed of the second leg of said differential, means for varying the speed of the second leg of said differential according to a predetermined schedule to thereby cause the speed of said prime mover to be varied according to said schedule.

3. The combination, with a power source, a prime mover energized by power supplied thereto from said source and a regulator for varying the speed of said prime mover, of a differential having one leg thereof driven by said prime mover at a speed proportional to the actual speed of said prime mover, means for driving the second leg of said differential at a speed proportional to the desired speed of said prime mover whereby the output leg of said differential reflects the difference between the actual and the desired speeds of said prime mover, means operated by the output leg of said differential for effecting operation of said regulator to thereby maintain the speed of said prime mover proportional to the speed of the second leg of said differential, means including a cam for varying the speed at which the second leg of said differential is driven to thereby vary the speed of said prime mover, and means for driving said cam to cause the speed of said prime mover to be varied according to a schedule determined by the contour of said cam.

4. The combination, with a power source, a prime mover energized by power supplied thereto from said source and a regulator for varying the speed of said prime mover, of a differential having one leg thereof driven by said prime mover at a speed proportional to the actual speed of said prime mover, means for driving the second leg of said differential at a speed proportional to the desired speed of said prime mover whereby the output leg of said differential reflects the difference between the actual and the desired speeds of said prime mover, means including a fluid motor for operating said regulator, means for supplying motive fluid to said motor, a pilot valve operated in response to movements of the output leg of said differential for controlling the flow of motive fluid to and from said motor to effect operation of said regulator and thereby maintain the speed of said prime mover proportional to the speed of the second leg of said differential, a follow-up mechanism operated by said regulator for returning said pilot valve to a position which maintains the prime mover at the speed indicated by the speed of the second leg of said differential after said valve has been moved to effect operation of said regulator operating means, a surge compensator adapted to effect operation of said fluid motor in response to changes in the torque of said prime mover and cause said motor to make approximate adjustments of said regulator to prevent such changes in torque from causing material variations in the speed of said prime mover and leaving to said pilot valve only the task of effecting final adjustments of said regulator, and means operated by said surge compensator for preventing lost motion from being created in said follow-up mechanism in response to said surge compensator effecting operation of said fluid motor.

5. The combination, with a power source, a prime mover energized by power supplied thereto from said source and a regulator for varying the speed of said prime mover, of a differential having one leg thereof driven by said prime mover at a speed proportional to the actual speed of said prime mover, means for driving the second leg of said differential at a constant speed which is proportional to the desired speed of said prime mover whereby movements of the output leg of said differential reflects the difference between the actual and the desired speeds of said prime mover, means including a fluid motor for operating said regulator, means for supplying motive fluid to said motor, a pilot valve operated in response to movements of the output leg of said differential for controlling the flow of motive fluid to and from said motor to effect operation of said regulator and thereby maintain the speed of said prime mover proportional to the speed of the second leg of said differential, means for varying the speed of the second leg of said differential according to a predetermined schedule to thereby vary the speed of said prime mover according to said schedule, and a follow up mechanism operated by said regulator for returning said pilot valve to a position which maintains the prime mover at the speed indicated by the speed of the second leg of said differential after said valve has been moved to effect operation of said regulator operating means.

6. The combination, with a hydraulic motor, a pump for supplying liquid to said motor to operate the same and means for varying the relative displacements of said pump and motor, of a differential having one leg thereof driven by said motor at a speed proportional to the actual speed of said motor, means for driving the second leg of said differential at a speed proportional to the desired speed of said motor whereby the output leg of said differential reflects the difference between the actual and the desired speeds of said motor, means including a servo-motor for operating said displacement varying means, means for supplying motive liquid to said servo-motor to operate the same, a pilot valve operated in response to movements of the output leg of said differential for controlling the flow of liquid to and from said servo-motor, a follow up mechanism for transmitting to said pilot valve movements created by operation of said servo-motor, means for varying the speed of the second leg of said differential according to a predetermined schedule, and means for driving said last named means to thereby cause the speed of said prime mover to be varied according to said schedule.

7. The combination, with a prime mover and means for changing the speed of said prime mover, of means for operating said speed changing means, chronometric mechanism for controlling said operating means, and means responsive to the lapse of time for varying the effect of said controlling means upon said operating means.

8. The combination, with a prime mover, of means for changing the speed thereof, an element rotating at a speed proportional to the desired speed of said prime mover, means responsive to variations in the relative speeds of said prime mover and said element for controlling the operation of said speed changing means, means operable independently of said prime mover for adjusting said control means to thereby cause said prime mover to operate at materially different predetermined speeds, and means for driving said last named means at a predetermined rate.

9. The combination, with a prime mover, of means for changing the speed thereof, means for controlling the operation of said speed changing means, a separate power source, means driven from said source for automatically adjusting said control means to thereby cause said prime mover to operate at different speeds during different periods of time, and other means driven from said separate source for varying the length of each period.

10. The combination, with a prime mover and means for changing the speed of said prime mover, of mechanism for operating said speed changing means, a drive for operating said mechanism, chronometric mechanism for modifying the effect of said drive upon the aforesaid mechanism, and means for continuously varying the effect of said chronometric mechanism during a given period of time.

11. The combination, with a prime mover and means for changing the speed of said prime mover, of mechanism for operating said speed changing means, a drive for operating said mechanism, chronometric mechanism for modifying the effect of said drive upon the aforesaid mechanism, means for varying the effect of said chronometric mechanism during a given period of time, and means for varying the length of said period.

12. The combination, with a prime mover and means for changing the speed of said prime mover, of chronometric mechanism, means for varying the speed of said chronometric mechanism, means controlled by said mechanism for operating said speed changing means to vary the speed of said prime mover during a given period of time, and means adjustable to vary the length of said period.

13. The combination, with a prime mover and means for changing the speed of said prime mover, of chronometric mechanism, means for varying the speed of said chronometric mechanism, means controlled by said mechanism for operating said speed changing means to vary the speed of said prime mover through a given range during a given period of time, means adjustable to vary the length of said period, and other means adjustable to enable said operating means to vary the speed of said prime mover through a different range.

14. In a speed controller for a prime mover, the combination of means for regulating the speed of said prime mover, a pendulum controlled chronometric mechanism for controlling said regulating means and operable at a predetermined speed to maintain the prime mover speed substantially at a predetermined constant, and means operated by separate mechanism for causing said chronometric mechanism to operate at a substantially different speed and thereby cause said prime mover to operate at a different speed.

15. In a speed controller for a prime mover, the combination of means for regulating the speed of said prime mover, a chronometric mechanism for controlling said regulating means and operable at a predetermined speed to maintain the prime mover speed substantially at a predetermined constant, a constant speed motor, and means operated by said motor for causing the speed of said chronometric mechanism to vary at a predetermined rate and thereby cause the prime mover speed to vary at a corresponding rate.

16. The combination, with a hydraulic motor, a pump for supplying liquid to said motor to drive the same, and means including a hydraulic servo-motor for varying pump displacement to thereby vary the speed of said motor, of a surge compensator for directing liquid to and from said servo-motor to thereby vary pump displacement, and means for operating said surge compensator in response to a variation in pump pressure caused by a variation in load to thereby prevent said variation in load from materially affecting the speed of said motor.

17. The combination, with a prime mover, a member rotated independently of said prime mover and means for changing the speed of said prime mover, of a differential gear, a drive connecting said prime mover to one leg of said differential to drive it at a speed proportional to the speed of said prime mover, a friction disk transmission connecting said member to the second leg of said differential to drive it at a speed proportional to the speed of said member whereby any variation in the relative speeds of said prime mover and said member causes rotation of the third leg of said differential, means connecting said third leg to said speed changing means to operate it in response to any variation in the relative speeds of said prime mover and said member and thereby cause said speed changing means to correct such variation, and power driven means for adjusting said transmission to vary the speed of said second leg relative to the speed of said member according to a predetermined schedule to thereby vary the speed of said prime mover.

18. The combination, with a pump having means for changing its displacement and a hydraulic motor connected to said pump and operated by liquid supplied thereby, of a differential having one leg thereof driven by said motor at a speed proportional to the actual speed of said motor, means for driving the second leg of said differential at a speed proportional to the desired speed of said motor whereby the third leg of said differential reflects the difference between the actual and the desired speeds of said motor, a fluid servo-motor for operating said displacement varying means, cam means for transmitting motion from said servo-motor to said displacement varying means to enable said servo-motor to adjust said displacement varying means micrometrically and to exert a large force thereon, means for supplying motive fluid to said servo-motor, a pilot valve for controlling said servo-motor, means for operating said pilot valve in response to movements of the third leg of said differential to thereby cause said servo-motor to vary pump displacement inversely to variations in the speed of said motor from the desired speed to effect correction of motor speed, and a follow-up mechanism for transmitting motion from said displacement varying means to said pilot valve.

19. The combination, with a pump having means for changing its displacement and a hydraulic motor connected to said pump and operated by liquid supplied thereby, of a differential having one leg thereof driven by said motor at a speed proportional to the actual speed of said motor, means for driving the second leg of said differential at a speed proportional to the desired speed of said motor whereby the third leg of said differential reflects the difference between the actual and the desired speeds of said motor, a fluid servo-motor for operating said displacement varying means, cam means for transmitting motion from said servo-motor to said displacement varying means to enable said servo-motor to adjust said displacement varying means micrometrically and to exert a large force thereon, an auxiliary pump for supplying motive fluid to said servo-motor at a constant pressure, a pilot valve for controlling said servo-motor, means for operating said pilot valve in response to movements of the third leg of said differential to thereby cause said servo-motor to vary pump displacement inversely to variations in the speed of said motor from the desired speed to effect correction of motor speed, and a follow-up mechanism for transmitting motion from said displacement varying means to said pilot valve.

20. The combination, with a pump having means for changing its displacement and a hydraulic motor connected to said pump and operated by liquid supplied thereby, of a differential having one leg thereof driven by said motor at a speed proportional to the actual speed of said motor, means for driving the second leg of said differential at a speed proportional to the desired speed of said motor whereby the third leg of said differential reflects the difference between the actual and the desired speeds of said motor, a fluid servo-motor for operating said displacement varying means, cam means for transmitting motion from said servo-motor to said displacement varying means, an auxiliary pump for supplying motive fluid to said servo-motor at a constant pressure, a pilot valve for controlling said servo-motor, means for operating said pilot valve in response to movements of the third leg of said differential to thereby cause said servo-motor to vary pump displacement inversely to variations in the speed of said motor from the desired speed to effect correction of motor speed, a follow-up mechanism for transmitting motion from said displacement varying means to said pilot valve, and a surge compensator operated by auxiliary pump fluid and responsive to variations in the load on said motor for directing additional motive fluid to and from said servo-motor to cause said servo-motor to make approximate adjustments of pump displacement in response to variations in motor load and thereby prevent variations in motor load from causing a material variation in motor speed and leaving to said pilot valve only the task of directing sufficient liquid to said servo-motor to effect slight adjustments of pump displacement.

21. The combination, with a prime mover, a regulator for varying the speed of said prime mover, a servo-motor for operating said regulator and means for supplying energy to said servo-motor, of a speed responsive control including a sensitive controller for controlling said servo-motor and means for shifting said controller in one direction or the other from a neutral position in response to errors in prime mover speed to thereby cause said servo-motor to operate said regulator to correct said errors in prime mover speed, a follow-up mechanism operated by motion created by said servo-motor and tending to return said controller to its neutral position as fast as it is moved therefrom in response to errors in prime mover speed, a load responsive control for effecting operation of said servo-motor and adapted to cause said servo-motor to make approximate adjustment of said regulator in response to changes in the torque of said prime mover to thereby prevent such changes in torque from causing material variations in prime mover speed and leaving to said speed responsive control the task of correcting slight variations in prime mover speed caused by said changes in torque, and means operated by said load responsive control for preventing lost motion from being created in said follow-up mechanism in response to said load responsive control effecting operation of said servo-motor.

22. The combination, with a hydraulic motor, a pump for supplying liquid to said motor to energize the same, a servo-motor for regulating pump displacement to thereby regulate the speed of said motor and means for supplying liquid to said servo-motor, of a speed responsive control including a pilot valve for controlling said servo-motor and adapted to effect operation of said servo-motor in response to errors in motor speed and thereby cause said servo-motor to operate said regulator to correct said errors in motor speed, a follow-up mechanism operated by motion created by said servo-motor and tending to return said valve to its neutral position as fast as it is moved therefrom in response to errors in prime mover speed, a load responsive control for effecting operation of said servo-motor and adapted to cause said servo-motor to make approximate adjustment of said pump in response to changes in the torque of said motor to thereby prevent such changes in torque from causing material variations in motor speed and leaving to said speed responsive control the task of correcting slight variations in motor speed caused by said changes in torque, and means operated by said load responsive control for preventing lost motion from being created in said follow-up mechanism in response to said load responsive control effecting operation of said servo-motor.

23. A chronometric controller, comprising a member driven by a prime mover at a speed proportional to the speed thereof, a chronometric mechanism, means for driving said mechanism, a control element for controlling the speed of said prime mover, means for shifting said control element in response to a variation in the speed of said member relative to the speed of said chronometric mechanism, and means for adjusting said chronometric mechanism through a given range according to a predetermined schedule.

24. A chronometric controller responsive to variations in a function of an external mechanism and actuating an external governing means for said function, said controller comprising a three-legged differential having a first leg driven by an external source of power at a speed proportional to the magnitude of said function and a second leg yieldingly restrained from rotation to thereby cause the third leg to rotate, an escape wheel connected to and driven by said third leg, a pendulum, an escape lever connected to said pendulum, pallets carried by said escape lever to engage the teeth of said escape wheel successively to enable said escape wheel to drive said pendulum and to enable said pendulum to regulate the speed of said third leg whereby any variation in the speed of said first leg relative to the speed of said third leg causes said second leg to rotate, a control element for controlling said governing means, means connecting said control element to said second leg and causing it to be operated in response to rotation of said second leg, and means for varying the length of said pendulum during oscillation thereof to thereby vary the speed of said third leg.

25. A chronometric controller, comprising a three-legged differential having a first leg driven from an external source of power and a second leg yieldingly restrained from rotation to thereby cause the third leg to rotate, a chronometric mechanism connected to and driven by said third leg and controlling the speed thereof whereby any variation in the speed of said first leg relative to the speed of said third leg causes said second leg to rotate, a control element, means connecting said control element to said second leg and causing it to be operated in response to rotation of said second leg, and means for progressively varying the speed of said chronometric mechanism according to a predetermined schedule to thereby progressively vary the speed of said third leg.

26. A chronometric controller, comprising a three-legged differential having a first leg driven from an external source of power and a second leg yieldingly restrained from rotation to thereby cause the third leg to rotate, an escape wheel connected to and driven by said third leg, a pendulum, an escape lever connected to said pendulum, pallets carried by said escape lever to engage the teeth of said escape wheel successively to enable said escape wheel to drive said pendulum and to enable said pendulum to regulate the speed of said third leg whereby any variation in the speed of said first leg relative to the speed of said third leg causes said second leg to rotate, a control element, means connecting said control element to said second leg and causing it to be operated in response to rotation of said second leg, and means for progressively varying the length of said pendulum according to a predetermined schedule to thereby progressively vary the speed of said third leg.

27. The combination, with a prime mover having means for varying its speed, a hydraulic servo-motor for operating said means to thereby regulate the speed of said prime mover and a source of liquid for operating said servo-motor, of a valve casing connected to said source and to a drain and having a port formed therein and connected to said servo-motor, a valve fitted in said casing and having a negative lap in respect to said port to thereby permit a slight flow of liquid from said source to drain when said valve is in its neutral position so that a slight movement of said valve in one direction or the other will increase or decrease the flow of liquid from said source to said port and thereby cause liquid to flow to and from said servo-motor at a minute rate, a three-legged differential having one leg thereof driven by said prime mover at a speed proportional to the actual speed of said prime mover, means for driving the second leg of said differential at a speed proportional to the desired speed of said prime mover whereby any difference between the actual speed and the desired speed of said prime mover causes the third leg of said differential to rotate, means for transmitting motion from said third leg to said pilot valve to shift the same and thereby cause said servo-motor to regulate the speed of said prime mover, and a follow-up mechanism operated by motion created by said servo-motor for returning said valve to its neutral position.

28. The combination, with a first hydrodynamic machine adapted to function as a motor, a second hydrodynamic machine adapted to function as a pump and deliver its entire volumetric output to said first machine and thereby cause said first machine to operate at a speed which is normally proportional to the ratio between the displacements of said two machines, and means for varying the displacement of one of said machines to thereby vary the speed of said first machine, of a three-legged differential having a first leg driven by said first machine at a speed proportional to the actual speed thereof, means for driving the second leg of said differential at a speed proportional to the desired speed of said first machine whereby the third leg of said differential reflects the difference between said actual and desired speeds, a hydraulic servo-motor for effecting operation of said displacement varying means, means for transmitting motion from said servo-motor to said displacement varying means and for reducing the extent of such motion to thereby cause a substantial movement created by said servo-motor to result in a micrometric adjustment of said displacement varying means, means for supplying motive liquid to said servo-motor, a pilot valve for controlling said servo-motor, means for operating said pilot valve in response to movement of said third leg to thereby cause said servo-motor to effect operation of said displacement varying means in a direction to correct the variation in speed which caused said third leg to move, and a follow-up mechanism for transmitting motion from said displacement varying means to said pilot valve.

29. The combination, with two hydrodynamic machines the first of which is adapted to function as a pump and deliver its entire volumetric output to the second of said machines and cause it to function as a motor and to operate at a speed which is normally proportional to the ratio between the displacements of the two machines and one of which is provided with a member for varying its displacement and with yielding means for urging said member in one direction, of a piston and a cylinder forming a hydraulic servo-motor for moving said member in the opposite direction; means for transmitting motion from said servo-motor to said member including a cam for reducing the extent of such motion to thereby cause a substantial movement of said piston to result in a micrometric movement of said member, means for supplying motive liquid to said servo-motor, a pilot valve for controlling said servo-motor, a three-legged differential having a first leg driven by said second machine at a speed proportional to the actual speed thereof, means for driving the second leg of said differential at a speed proportional to the desired speed of said second machine whereby the third leg of said differential reflects the difference between said actual and desired speeds, means for operating said pilot valve in response to movement of said third leg to cause said servo-motor to operate in one direction or the other and thereby cause said member to be shifted in one direction or the other to vary the displacement of one machine and thereby correct the speed of said second machine, and a follow-up mechanism for transmitting motion from said displacement varying means to said pilot valve.

WALTER FERRIS.